United States Patent
Gupta et al.

(10) Patent No.: US 10,271,245 B2
(45) Date of Patent: Apr. 23, 2019

(54) METHODS AND SYSTEMS FOR TRANSFERRING HOTSPOT SESSION

(71) Applicant: Samsung Electronics Co., Ltd., Gyeonggi-do (KR)

(72) Inventors: Akash Gupta, Noida (IN); Rishikesh Kumar, Noida (IN)

(73) Assignee: Samsung Electronics Co., Ltd (KR)

( * ) Notice: Subject to any disclaimer, the term of this patent is extended or adjusted under 35 U.S.C. 154(b) by 101 days.

(21) Appl. No.: 15/383,106

(22) Filed: Dec. 19, 2016

(65) Prior Publication Data

US 2017/0180433 A1    Jun. 22, 2017

(30) Foreign Application Priority Data

Dec. 18, 2015 (IN) ............................ 4171/DEL/2015
Dec. 16, 2016 (KR) ......................... 10-2016-0172447

(51) Int. Cl.
  *H04W 76/20* (2018.01)
  *H04W 36/00* (2009.01)
  (Continued)

(52) U.S. Cl.
  CPC ....... *H04W 36/0033* (2013.01); *H04W 76/20* (2018.02); *H04W 36/00835* (2018.08); *H04W 36/24* (2013.01); *H04W 84/12* (2013.01)

(58) Field of Classification Search
  CPC ........... H04L 65/1086; H04L 29/08639; H04L 69/40; H04L 29/08252; H04L 65/1093; H04W 36/08; H04W 36/0011; H04W 84/18; H04W 28/021; H04W 76/10; H04W 76/11; H04W 76/12; H04W 76/14; H04W 76/15; H04W 76/19; H04W 84/20;
  (Continued)

(56) References Cited

U.S. PATENT DOCUMENTS 7,269,174 B2   9/2007 Olson et al.
8,750,180 B2   6/2014 McCann et al.
(Continued)

FOREIGN PATENT DOCUMENTS

EP    1883186 A1 *  1/2008  .......... H04W 60/005
EP    1 883 186    9/2013
KR    1020150034496  4/2015

*Primary Examiner* — Joshua Kading
*Assistant Examiner* — Lalita W Pace
(74) *Attorney, Agent, or Firm* — The Farrell Law Firm, P.C.

(57) ABSTRACT

Methods, electronic devices and systems for transferring hotspot session are provided. The methods include detecting an event to transfer a hot spot session of an electronic device which is a host access point in a network to a different electronic device, in response to detecting the event, determining at least one different electronic device from among the plurality of electronic devices as a target access point of the network, and sending a request for hotspot session transfer and client configuration details corresponding to a plurality of client devices which are coupled to be communicable with the electronic device to the at least one different electronic device, wherein, in response to the at least one different electronic device receiving the hotspot session transfer request through the communication interface, the at least one different device operates as a host access point providing a hotspot session in the network.

20 Claims, 23 Drawing Sheets

(51) Int. Cl.
*H04W 84/12* (2009.01)
*H04W 36/24* (2009.01)

(58) Field of Classification Search
CPC ..... H04W 84/22; H04W 76/20; H04W 76/22; H04W 76/25; H04W 36/00; H04W 84/12
See application file for complete search history.

(56) References Cited

U.S. PATENT DOCUMENTS

| | | |
|---|---|---|
| 9,144,008 B2 | 9/2015 | Attar et al. |
| 2005/0030922 A1 | 2/2005 | Lee et al. |
| 2006/0030293 A1* | 2/2006 | Karaoguz ............ H04L 63/105 455/408 |
| 2007/0115906 A1* | 5/2007 | Gao ................... G06F 17/5022 370/338 |
| 2011/0287759 A1* | 11/2011 | Jung ................. H04W 52/0206 455/422.1 |
| 2012/0120916 A1* | 5/2012 | Omori .............. H04W 36/0033 370/331 |
| 2014/0082697 A1* | 3/2014 | Watfa .................... H04W 76/15 726/3 |
| 2015/0282195 A1* | 10/2015 | Farhadi ............... H04W 72/085 370/229 |
| 2015/0365952 A1* | 12/2015 | Wang .................. H04L 65/4076 370/329 |
| 2016/0242107 A1 | 8/2016 | Yang et al. |
| 2016/0302060 A1* | 10/2016 | Agardh ................... H04L 67/16 |
| 2016/0337878 A1* | 11/2016 | Frederiksen .......... H04W 24/02 |
| 2016/0337923 A1* | 11/2016 | Xu ....................... H04L 47/125 |

\* cited by examiner

METHODS AND SYSTEMS FOR TRANSFERRING HOTSPOT SESSION

CROSS-REFERENCE TO RELATED APPLICATION

This application is based on and claims priority under 35 U.S.C. § 119 to Indian Patent Application No. 4171/DEL/2015, filed on Dec. 18, 2015, and Korean Patent Application No. 10-2016-0172447, filed on Dec. 16, 2016, in the Korean Intellectual Property Office, the disclosures of which are incorporated herein by reference in their entirety.

BACKGROUND

1. Field

The present disclosure relates generally to methods and systems for establishing a communication link between client electronic devices and a hotspot access point, and, more specifically, to methods and systems for transferring of hotspot session.

2. Description of Related Art

Wireless access points have replaced wired routers to provide access to communication network (e.g. the Internet). These wireless access points have wired backbone to connect with the communication network. These wireless access points include Wi-Fi feature that enables wireless client devices such as smart phone, laptop, tablet, and notebook to connect with the wireless access point and access the communication network. Further improvements enabled the wireless access point to connect with the communication network via a cellular dongle connected with USB ports present in the wireless access point instead of wired backbone. Further improvement enabled the wireless client devices to act as access point (hotspot) and as client devices depending upon selected configuration. Consequently, the use of such wireless client devices have significantly increased as same devices can be used as client as well as hotspot based on requirement.

Presently, with advent of technology, various client devices can intercommunicate with each other over a network. One of the client devices can be converted as an access point to create the network. The access point then provides access to the network to other client devices when the client devices connect with the access point. The client devices can connect with the access point via various communication links such as Wi-Fi, Bluetooth, and USB. Currently the connected client devices switch access points dynamically and connect to other access points based on various parameters such as distance from the access point and signal strength of the access point. However, when the access point goes out of the network due to various criteria such as shutting down, powering off, loss of signal strength, and unavailability of network, the connected client devices disconnect from each other and from the access point. To connect again, the client devices searches for same network credentials and in absence of the previous access point, the client device are unable to connect. In some events, the client devices may connect with alternate access point that is preconfigured. However, the alternate access point may not be available at the time of disconnection of the client devices from the previous access point.

Various solutions are available which enable the client devices to connect with other access points overcoming the above deficiency. In one solution, a mobile station selects an access point from amongst a plurality of access points based on state information of the access points. The selected access point then establishes a physical channel between the mobile station and a wireless local area network (WLAN) to provide maximum performance of data transmission such as high-speed wireless internet services. Accordingly, each of the access points inserts first state information of the access point about the number of connected mobile stations into a Beacon frame/Probe Response message frame of WLAN media access control (MAC) layer. Each of plurality of the access points then transmits the Beacon frame/Probe Response message frame of the first state information to the mobile station. Thereupon, each of the access points inserts second state information about a currently processed traffic amount into the Beacon frame/Probe Response message frame and transmits the Beacon frame/Probe Response message to the mobile station. Upon receiving the first and second state information, the mobile station selects one of access points based on the first and second state information.

Thus, the solution enables effective selection of the access point by the mobile station based on comparison state information received from the access points in order to have the maximum performance of data transmission during initial association step and re-association step. The state information may include not only the receiving sensitivity of the access points but also the number of mobile stations connected to the access point and the traffic amount of the access point. However, the solution only enables selection among active access points by the mobile station and does not handle the situation when the connected access point goes out of the network due to various criteria.

In another solution, backbone access points ("Backbone APs") and wireless access points ("Wireless APs") provide a dynamically reconfigurable dynamic wireless network to mobile stations with local area network ("LAN"). Backbone APs physically connect to the LAN. Levels of Wireless APs are daisy-chained together and connect to the Backbone AP, providing an extended area of network coverage. Mobile stations can connect with either Backbone APs or Wireless APs. Dynamic Reconfiguration prevents single point failures. Each AP contains a router, Address Resolution Protocol ("ARP") cache, and Distributed Routing Table ("DR Table"). The DR Table maintains the Media Access Control ("MAC") address and the Internet Protocol ("IP") address of each AP below it in the Distributed Routing Tree. Additionally, each DR Table also maintains the IP address for the device each AP is connected. The Distributed Routing Tree is dynamically reconfigured to minimize transmission hops or to maximize signal strength between the mobile stations and the LAN.

Thus, the solution provides a wireless network system which can dynamically configure itself to adapt to changes in the AP network. This enables the wireless network system to be resilient to hardware failures, changes in atmospheric conditions, and interference of transmission paths. This further enables the wireless network system to transmit messages efficiently between mobile stations, without flooding the communications network. However, this solution does not handle the situation when the Backbone APs goes out of the network due various criteria.

As can be gathered from above, the above-mentioned solutions requires presence of plurality of active access points and are not effective when only one active access point is present in the network. Further, the solutions necessitate either each of the mobile stations or client devices and/or the access points have information of about other access points for connecting/reconnecting with other access points since the details connected client devices are not shared within the network. Thus, there exists a need for a solution to overcome above-mentioned deficiencies.

SUMMARY

Example embodiments of the present disclosure address the above disadvantages among other things.

According to an aspect of an example embodiment, a method for communicating of an electronic device in a network environment comprising a plurality of electronic devices includes detecting an event to transfer a hot spot session of an electronic device which is a host access point in the network to a different electronic device, in response to detecting the event, determining at least one different electronic device from among the plurality of electronic devices as a target access point of the network, and sending a request for hotspot session transfer and client configuration details corresponding to a plurality of client devices which are coupled to be communicable with the electronic device to the at least one different electronic device, wherein, in response to the at least one different electronic device receiving the hotspot session transfer request through the communication interface, the at least one different device operates as a host access point providing a hotspot session in the network.

In this case, the detecting an event may include monitoring a powering state, a shutdown state, a memory availability state, and a network availability state of the electronic device, and a state of client devices coupled with the electronic device, and in response to a state being at least one of a powered-off state of power within the electronic device, memory space within the electronic device within preset memory space, shutdown state of the electronic device, unavailable state of the network, determining the electronic device to be in an unavailable state as the host access point in the network.

The determining may further may include transferring a request for the hotspot session to the plurality of electronic devices and selecting at least one of different electronic device transmitting an acknowledge message from among the plurality of electronic devices as the target access point.

The acknowledge message may include device parameters and supported protocol lists which are features of a device respectively corresponding to each of the plurality of electronic devices.

The determining may include determining at least one different electronic device including at least one communication link available in the electronic device from among the device parameters and the supported protocol lists of the plurality of electronic devices as the target access point of the network.

The device parameters and the supported protocol list may include at least one communication link which is supported by the plurality of client devices and is available by the electronic device.

The transmitting may further include transferring a hotspot session transferring configuration request to the at least one different electronic device, wherein, in response to receiving the hotspot session transferring configuration request by the at least one different electronic device, the plurality of client electronic devices are disconnected with the electronic device and automatically connected with the at least one different electronic device.

The hotspot session transferring request may include network configuration data including network name, service set identifier (SSID), operational frequency, network protocol, password, channel of operation, and encryption type of the electronic device, and network configuration data corresponding to each of the plurality of client electronic devices including session information including at least one of internet protocol (IP) address, device name, communication link, channel of operation, data limit, location, and memory cache of each of the plurality of client electronic devices and state information.

The plurality of electronic devices may be at least one that the plurality of electronic devices have a same network configuration as the electronic device, the plurality of electronic devices are coupled with the electronic device for communication in at least one network hosted by the electronic device, and the plurality of electronic devices have proximity to the electronic device outside at least one network hosted by the electronic device.

The hotspot session transferring request may include network configuration data corresponding to at least one communication link which is transferred using a message frame, is in an active state on the electronic device, and is supported by the plurality of electronic devices.

According to an example embodiment of the present disclosure, an electronic device for performing network communication in a network environment comprising a plurality of electronic devices may include a communication interface, and a processor configured to detect an event to transfer a hot spot session of an electronic device which is a host access point in the network to at least one different electronic device, to, in response to detecting the event, determine at least one different electronic device from among the plurality of electronic devices as a target access point of the network, and to send a request for hot spot session transfer and client configuration details corresponding to a plurality of client devices which are coupled to be communicable with the electronic device to the at least one different electronic device via the communication interface, wherein, in response to the at least one different electronic device receiving the hotspot session transfer request through the communication interface, the at least one different device operates as a host access point providing a hotspot session in the network.

The processor may monitor a powering state, a shutdown state, a memory availability state, and a network availability state of the electronic device, and a state of client devices coupled with the electronic device, and to, in response to a state being at least one of a powered-off state of power within the electronic device, memory space within the electronic device within preset memory space, shutdown state of the electronic device, unavailable state of the network, determine the electronic device to be in an unavailable state as the host access point in the network.

The processor may transfer a request for the hotspot session to the plurality of electronic devices, and to select the at least one different electronic device transmitting an acknowledge message from among the plurality of electronic devices as the target access point.

The processor may determine at least at least one different electronic device including at least one communication link available in the electronic device from among the device parameters and the supported protocol lists of the plurality of electronic devices as the target access point of the network.

The device parameters and the supported protocol list may include at least one communication link which is supported by the plurality of client devices and is available by the electronic device.

The advantages of the disclosure include, but not limited to, enabling a host access point to transfer hotspot session or role to another electronic device at runtime and rest of the connected client electronic devices can shift into new access point and access the network. This eliminates the need for having multiple active access point in the network. Further, the host access point performs selection of another electronic device at run time upon detecting an event or requirement. This eliminates the need for the connected client devices to receive or store information of about other access points for connecting/reconnecting.

Further, the host access point transmits essential information such as network configuration details and optional information such as client configuration details to the selected electronic device. This allows the selected electronic device to acquire the same network address and assign the same network characteristics to each connect client devices such that the client devices experience no change during the network re-establishment. In addition, the host access point may also transmit rules and restrictions applied on the network to the selected electronic device. This allows the selected electronic device to have the same rules and restrictions as applied earlier.

Furthermore, the host access point transmits essential information such as network configuration details and optional information such as client configuration details to the selected electronic device. This enables transferring of the hotspot session to any electronic device capable of providing the network, irrespective whether the electronic device can be connected with the host access point in the network or outside the network. In addition, the host access point can transmit the essential information to multiple devices. Thus, if one electronic device can be not available to support all communication active links in the network, the host access point can transmit the essential information to different devices capable of supporting one or more of the communication links active in the network. This eliminates the dependency on availability of a single electronic device with the same capabilities as that of the existing host access point since more than one electronic device can become access points enabling access to the network to all connected client devices.

In addition, each device in the network created by the host access point, including the host access point, can include the functionalities for transferring the hotspot session. The functionalities include detecting the requirement to transfer the hotspot session, determining a target electronic device to which the session will be transferred, transferring network configuration details to the target device, and creating the same network based on the network configuration details. This enables ease of transferring the hotspot session to any electronic device capable of providing the network. Furthermore, the host access point sends the client configuration details based on preconfigured transfer permission data corresponding to each of the client electronic devices. This improves security of the client electronic devices and protects privacy of the client electronic devices.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein.

DETAILED DESCRIPTION

Figure 1A:
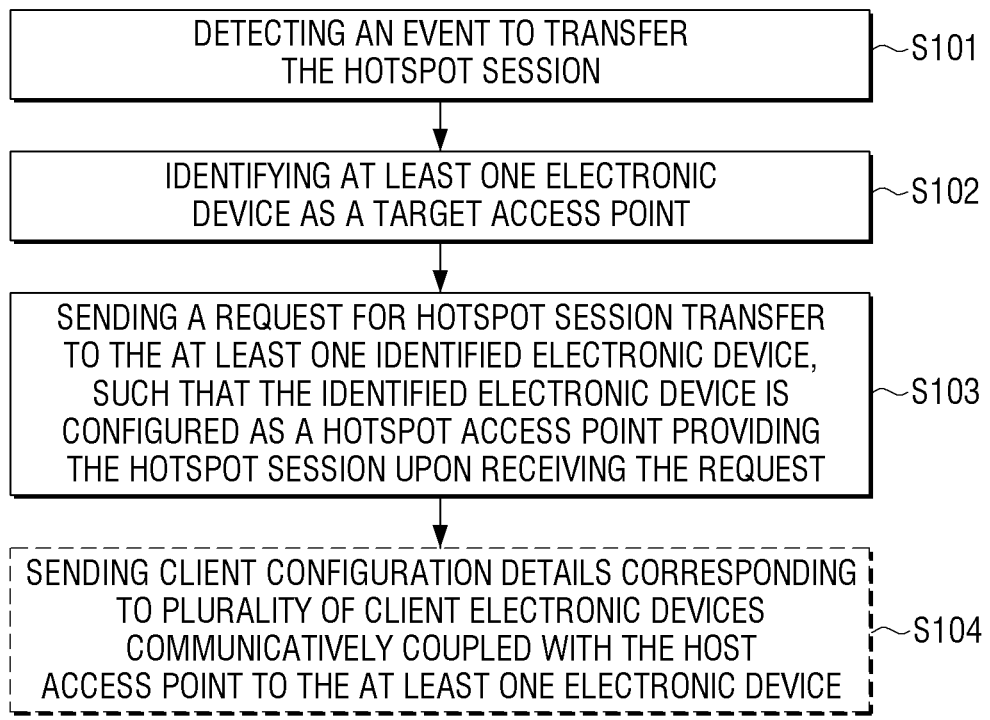
FIGS. 1A and 1B illustrate a first exemplary method for transferring hotspot session from a host access point, in accordance with an embodiment of the present disclosure.

Before describing the example embodiments in detail, the terminology used herein will be briefly explained.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The example embodiments of the present disclosure may have a variety of modifications and several examples. Accordingly, while various example embodiments are described in detail herein, these are not intended to limit the scope of the present disclosure to the particular example embodiments only. Rather, it should be understood that the example embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

In the example embodiments of the present disclosure, when a certain portion is "coupled" with another portion, this means not only the "direct coupling", but also "electrical coupling" and may be accomplished with intervention of another device interposed there between. Further, when a certain portion "comprises" a certain element, unless otherwise specified, this means that the certain portion may additionally include another element, rather than precluding another element.

In the example embodiments of the present disclosure, "electronic device" means "electronic apparatus."

The present disclosure will be described in greater detail below with reference to the accompanying drawings to enable those skilled in the art to work the present disclosure with ease. However, the present disclosure may be implemented as several different forms and not to be limited to any of specific examples described herein. Further, in order to clearly describe the present disclosure in the drawings, portions irrelevant to the description may be omitted, and throughout the description, the like elements are given the similar reference numerals.

Further, in the example embodiments of the present disclosure, a user input may include various input circuitry, such as, for example, and without limitation, at least one of touch input, bending input, voice input, button input, motion input, and multimodal input, but not limited thereto.

In accordance with the purposes of the disclosure, the present disclosure as embodied and broadly described herein, provides for transferring hotspot session from a host access point. Accordingly, upon detecting an event for transferring of hotspot session, the host access point determines and selects an electronic device as a target access point. The event can be user-input, unavailability of the host access point, unavailability of a network in the host access point, failure of at least one functionality of the host access point, low power in the host access point, low memory space in the host access point, availability of a higher performance electronic device in proximity to the host access point, scheduled time of transferring the hotspot session, exceeding data limit, and introduction of at least one functionality to the host access point.

In one embodiment, the electronic device can be selected from a plurality of client electronic devices communicatively coupled with the host access point in a network created by the host access point. In another embodiment, the electronic device can be selected from a plurality of client electronic devices in proximity to the host access point outside a network hosted by the host access point. In one another embodiment, the selected electronic device can be a preconfigured backup hotspot access point.

Upon selecting the electronic device, the host access point sends a request for hotspot session transfer to the selected electronic device. The request include network configuration details corresponding to one or more communication links active on the host access point and supported by the selected electronic device. In one embodiment, the host access point sends a configuration request for hotspot session transfer to the selected electronic device. The configuration request includes client configuration details corresponding to plurality of client electronic devices communicatively coupled with the host access point and a time period for configuring the selected electronic device as the hotspot access point.

Upon receiving the request, the selected electronic device can be configured as a hotspot access point providing the hotspot session. The earlier or previous host access point then disconnects from the network. Consequently, the plurality of client electronic devices disconnects from the earlier or previous hotspot access point and establishes connection with the selected electronic device.

Hereinbelow, various example embodiments of the present disclosure will be described in greater detail with reference to the accompanying drawings.

Figure 1B:
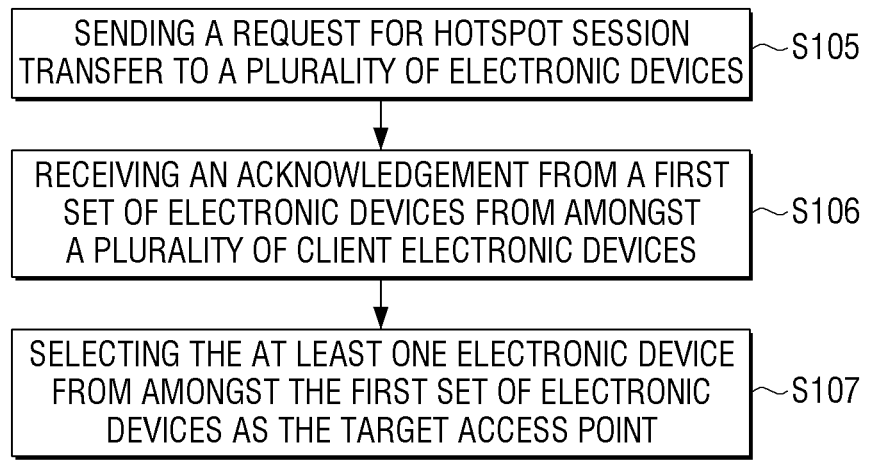

FIGS. 1A and 1B illustrate a first exemplary method for transferring hotspot session from a host access point, in accordance with an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

Referring to FIG. 1A, at step S101, an event to transfer the hotspot session is detected. The event includes at least one of: user-input, unavailability of the host access point, unavailability of a network in the host access point, failure of at least one functionality of the host access point, low power in the host access point, low memory space in the host access point, availability of a higher performance electronic device in proximity to the host access point, scheduled time of transferring the hotspot session, exceeding data limit, and introduction of at least one functionality to the host access point. Further, the host access point hosts one or more networks based on one or more communication links active on the host access point.

At step S102, at least one electronic device is identified (or determined) as a target access point.

At step S103, a request for hotspot session transfer to the at least one identified electronic device is sent. Thereupon, the identified electronic device is configured as a hotspot access point, with same network configuration as the host access point, providing the hotspot session upon receiving the request. The request for hotspot session transfer includes network configuration details corresponding to one or more communication links active on the host access point and supported by the at least one identified electronic device.

At step S104, client configuration details corresponding to plurality of client electronic devices communicatively coupled with the host access point are sent to the at least one identified electronic device, wherein the plurality of client electronic devices establishes connection with the at least one identified electronic device.

Referring to FIG. 1B, the identification step as illustrated at step S102 includes further steps. Accordingly, at step S105, a request for hotspot session transfer is sent to a plurality of electronic devices. The request includes a protocol list comprising of one or more communication links active on the host access point. In one implementation, the plurality of client electronic devices is communicatively coupled with the host access point in a network hosted by the host access point. In another implementation, the plurality of client electronic devices is in proximity to the host access point outside one or more networks hosted by the host access point.

At step S106, acknowledgement from a first set of electronic devices amongst the plurality of client electronic devices are received. The acknowledgement comprises one or more device parameters and a supported protocol list corresponding to each of the first set of electronic devices. The supported protocol list comprises one or more communication links supported by the client electronic device and available on the host access point.

At step S107, the at least one electronic device is selected from amongst the first set of electronic devices as the target access point based on the device parameters and the supported protocol list.

Figure 2:
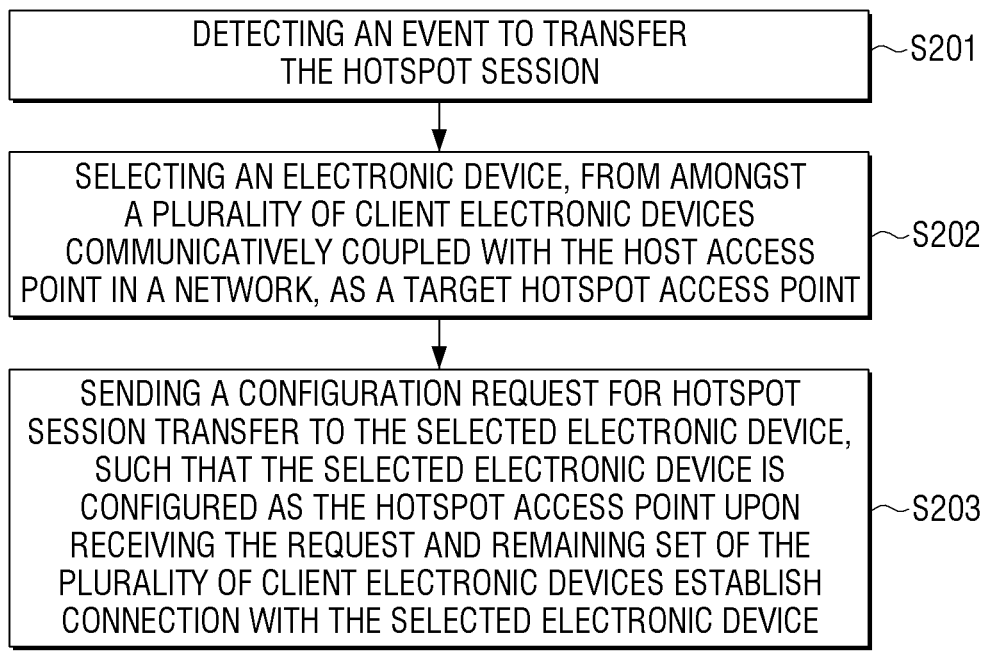
FIG. 2 illustrates a second exemplary method for transferring hotspot session from a host access point, in accordance with an embodiment of the present disclosure.

FIG. 2 illustrates a second exemplary method for transferring hotspot session from a host access point, in accordance with an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At step S201, an event to transfer the hotspot session is detected. The event includes at least one of: user-input, unavailability of the host access point, unavailability of a network in the host access point, failure of at least one functionality of the host access point, low power in the host access point, low memory space in the host access point, availability of a higher performance electronic device in proximity to the host access point, scheduled time of transferring the hotspot session, exceeding data limit, and introduction of at least one functionality to the host access point. Further, the hotspot access point hosts a network based on one communication link.

At step S202, an electronic device is selected from amongst a plurality of client electronic devices communicatively coupled with the host access point in a network as a target hotspot access point based on one or more parameters. Further, the one or more parameters includes preconfigured list of electronic devices capable of being hotspot access device and user-input corresponding to identification of the electronic device.

At step S203, a configuration request is sent for hotspot session transfer to the selected electronic device. The selected electronic device is configured as the hotspot access point upon receiving the request, with same network configuration as the host access point, and remaining set of the plurality of client electronic devices establish connection with the selected electronic device. The configuration request includes client configuration details corresponding to plurality of client electronic devices communicatively coupled with the host access point to the selected electronic device. Further, the configuration request includes a time period for configuring the selected electronic device as the hotspot access point, active firewall rules and exception, proxy server settings, state information of each of the client electronic devices, and pre-stored information of inactive client electronic devices.

Figure 3:
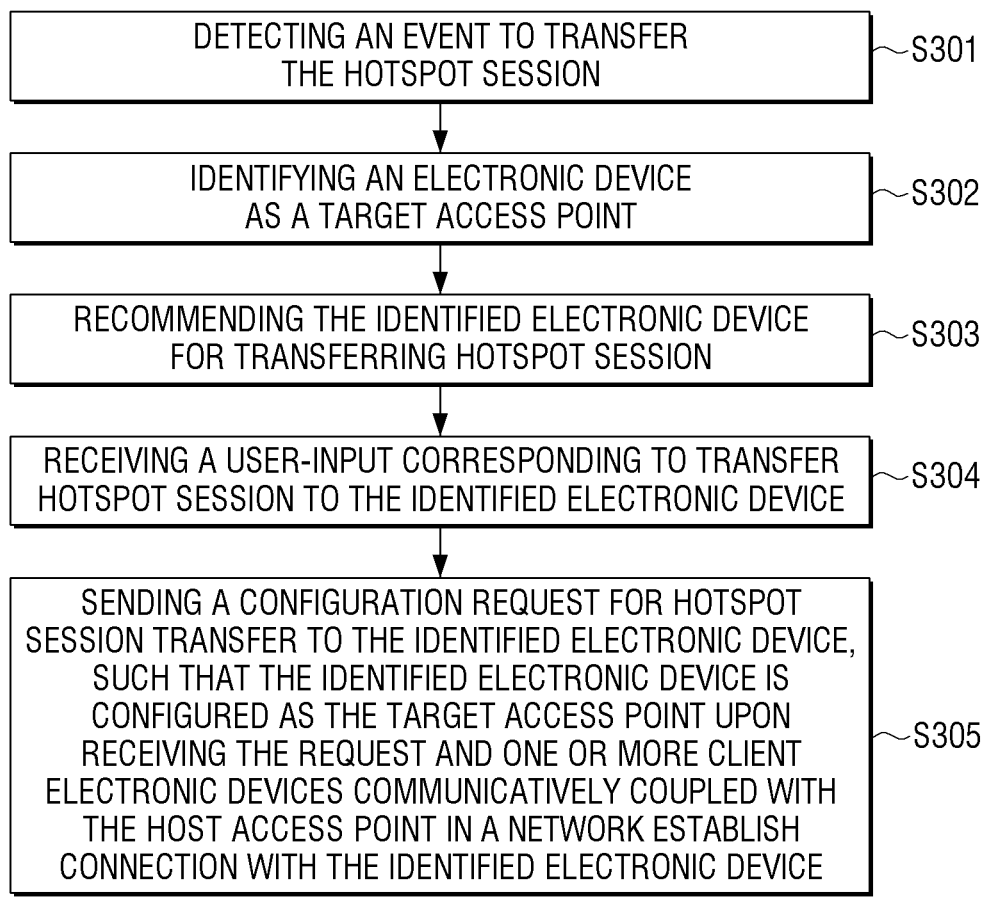
FIG. 3 illustrates a third exemplary method for transferring hotspot session from a host access point, in accordance with an embodiment of the present disclosure.

Further, FIG. 3 illustrates a third exemplary method for transferring hotspot session from a host access point, in accordance with an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At step S301, an event to transfer the hotspot session is detected. The event includes one of: availability of the electronic device in proximity to the host access point and requirement of functionality by one or more client electronic devices. Further, the host access point hosts one or more networks based on one or more communication links active on the host access point.

At step S302, an electronic device is identified as a target access point. The electronic device can be outside the one or more networks hosted by the host access point. The electronic device can be a preconfigured backup hotspot access point.

At step S303, the identified electronic device is recommended for transferring hotspot session.

At step S304, a user-input corresponding to transfer hotspot session to the identified electronic device is received.

At step S305, a configuration request for hotspot session transfer is sent to the identified electronic device. Upon receiving the request, the identified electronic device is configured as the target access point, with same network configuration as the host access point. Consequently, one or more client electronic devices communicatively coupled with the host access point in the one or more networks establish connection with the identified electronic device, with same network credentials used for connecting with the host access point. Accordingly, a request for hotspot session transfer is sent to the identified electronic device. Upon receiving an acknowledgement from the identified electronic device, the configuration request is sent. Further, the host access point sends client configuration details corresponding to the one or more client electronic devices to identified electronic device. However, the host access point sends the client configuration details based on preconfigured transfer permission data corresponding to each of the one or more client devices.

Figure 4:
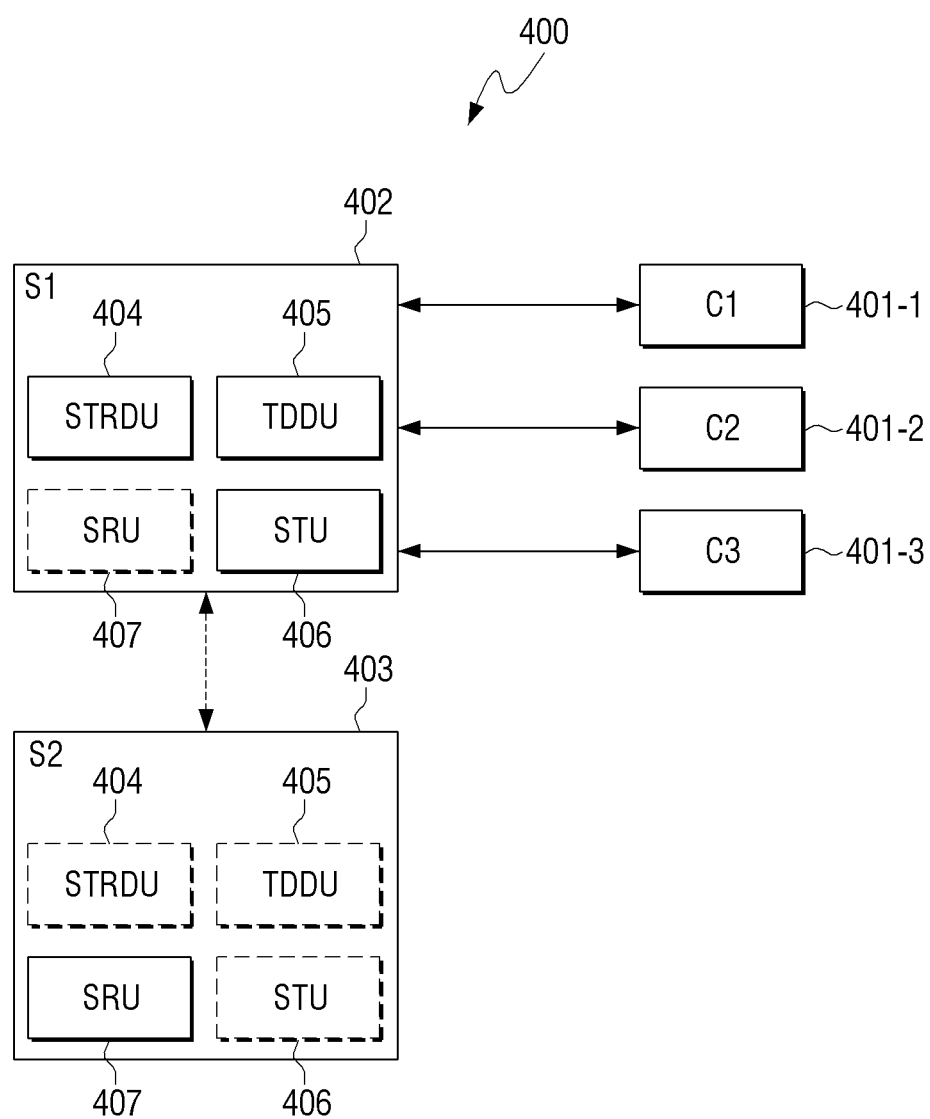
FIG. 4 schematically illustrates an exemplary network implementing transferring of hotspot session, in accordance with an embodiment of the present disclosure.

FIG. 4 schematically illustrates an exemplary network environment implementing transferring of hotspot session, in accordance with an embodiment of the present disclosure.

The network environment (400) includes a plurality of client electronic devices (401-1, 401-2, 401-3) connected over one or more hotspot networks hosted by an electronic device S1 (402), which is acting as a host access point. Examples of the electronic device S1 (402) include, but not limited to, wireless router, smart phone, personal desktop, laptop, tablet, notebook, personal digital assistant, and special purpose hotspot device. For the sake of brevity, only three client electronic devices, C1 (401-1), C2 (401-2), and C3 (401-3) are illustrated. In one example, the network environment (400) can be a smart home network. The smart home network includes a plurality of home devices as client electronic devices communicatively coupled to a control device such as smart phone hosting a hotspot. Examples of the home device include, but not limited to, a smart refrigerator, a smart air conditioner, a smart electric curtain, a smart lamp, a smart socket, a music system, smart speakers, smart thermostat, smart sensors, and a smart television.

In accordance with the disclosure, the electronic device S1 (402) acting as the host access point is capable of transferring the hotspot session to a target electronic device S2 (403), capable of acting as hotspot access point. In one embodiment, the target electronic device S2 (403) can be one of the plurality of client electronic devices communicatively coupled with the host access point in the network. In another embodiment, the target electronic device S2 (403) can be one of plurality of electronic devices outside the network. In one another embodiment, the target electronic device S2 (403) can be a preconfigured backup hotspot access point. Examples of the target electronic device S2 (403) include, but not limited to, wireless router, smart phone, personal desktop, laptop, tablet, notebook, personal digital assistant, and special purpose hotspot device.

Accordingly, the electronic device S1 (402) includes a session transfer requirement detection unit (STRDU) (404) to detect a requirement to transfer the hotspot session. Examples of such requirement include, but not limited to, shutting down/powering off the electronic device S1 (402), low power in the electronic device S1 (402), and unavailability of network in the electronic device S1 (402).

The electronic device S1 (402) further includes a target device determination unit (TDDU) (405) to determine and select the target electronic device S2 (403) to which the hotspot session will be transferred.

The electronic device S1 (402) further includes a session transfer unit (STU) (406) for transferring network configuration data to the target electronic device S2 (403).

Similarly, the target electronic device S2 (403) includes a session receiving unit (SRU) (407) to determine capability of the target electronic device S2 (403) to become hotspot access point and provides acknowledgement to the TDDU (405).

Further, upon receiving the data from the STU (406), the SRU (407) processes the data and configures the target electronic device S2 (403) as the target access point with the same network configuration data sent by the electronic device S1 (402) to provide hotspot access to the plurality of client electronic devices C1 (401-1), C2 (401-2), and C3 (401-3). Upon transferring of the hotspot session from the electronic device S1 (401) to the target electronic device S2 (403), the electronic device S1 (402) disconnects from the network. Consequently, the plurality of client electronic devices C1 (401-1), C2 (401-2), and C3 (401-3) disconnect from the electronic device S1 (402) and connect with the target electronic device S2 (403) automatically with the same network credentials as used for establishing network connection with the electronic device S1 (402).

Further, the target electronic device S2 (403) includes the STRDU (404), TDDU (405), and STU (406) to enable the target electronic device S2 (403) to transfer the hotspot session to the electronic device S1 (402) or any other electronic device at a later point. Similarly, the electronic device S1 (402) includes the SRU (407) to enable the electronic device S1 (402) to receive the hotspot session transfer request from the target electronic device S2 (403) or any other hotspot access point at a later point. Thus, each of the electronic devices in the network, capable of providing hotspot access, include four units namely, STRDU (404), TDDU (405), STU (406), and SRU (407). As such, during transferring of the hotspot session, the STRDU (404), the TDDU (405), and the STU (406) are active (illustrated using bold lines in the electronic device S1 (402)) and the SRU (407) is inactive (illustrated using dashed lines in the electronic device S1 (402)). On the other hand, during receiving of the hotspot session, the SRU (407) is active (illustrated using bold lines in the target electronic device S2 (403)) and the STRDU (404), the TDDU (405), and the STU (406) are inactive (illustrated using dashed lines in the target electronic device S2 (403)).

Figure 5A:
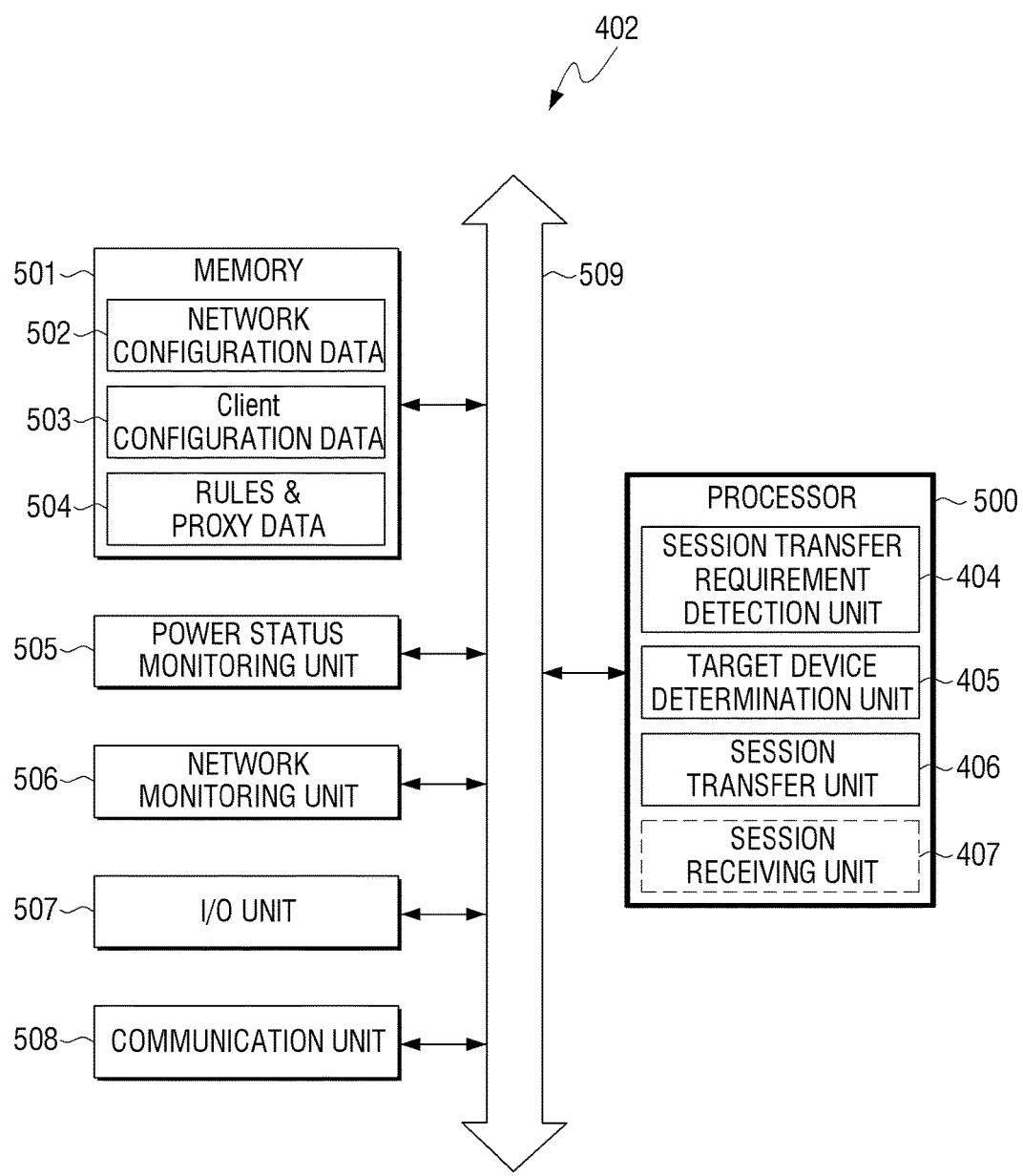
FIG. 5A illustrates an exemplary host access point transferring hotspot session, in accordance with an embodiment of the present disclosure.

FIG. 5A illustrates an exemplary host access point transferring hotspot session, in accordance with an embodiment of the present disclosure.

Referring to FIG. 5A, the electronic device S1 (402) as described in FIG. 4 may be acting as the host access point, in accordance with an embodiment of the present disclosure. The host access point provides one or more networks such as internet and virtual private network (VPN) access from a given location. The host access point connects various electronic devices within the one or more networks and serves as a gateway between the connected electronic devices and the one or more networks.

The host access point (402) includes a processor (500) adapted to perform necessary functions of the host access point (402). The processor (500) includes the STRDU (404), the TDDU (405), the STU (406), and the SRU (407). Additionally, the processor (500) detects events corresponding to a user-input for transferring hotspot session. The user input can be provided via various methods such as pressing a predefined key on a remote controller. The processor (500) also monitors various units and modules of the host access point (402) to detect events corresponding to failure functionality, low memory space, and introduction of new functionality.

Further, the host access point (402) includes a memory (501). The memory (501) stores network configuration data (502) and client configuration data (503). The network configuration data (502) includes network name or Service Set Identifier (SSID), operational frequency, request type, network protocol, password, channel of operation, and encryption type. The client configuration data (503) includes Internet Protocol (IP) address, Media Access Control (MAC) address, device name, communication link, channel of operation, data limit, location, firewall rules, pre-cache key, and session information and state, such as memory cache, and internet packet exchange state, of each of the plurality of client electronic devices C1 (401-1), C2 (401-2), and C3 (401-3) coupled to the host access point (402) in the network as illustrated in FIG. 4. The memory (501) also includes rules and proxy data (504) necessary for transferring the hotspot session. The rules and proxy data (504) includes active firewall rules and exceptions, proxy server settings, scheduling information of new hotspot network, and non-connected remembered client information. This allows target access point to have the same rules and restrictions as applied earlier.

Further, the host access point (402) includes a power status monitoring unit (PSMU) (505) for monitoring power status of the host access point (402) and detecting event corresponding to low power in the host access point (402). The host access point (402) further includes a network monitoring unit (NMU) (506) for monitoring network status of the host access point (402) and detecting event corresponding to unavailability of one or more networks in the host access point (402). In addition, the NMU (506) monitors the plurality of electronic devices C1 (401-1), C2 (401-2), and C3 (401-3) coupled to the host access point (402) in the one or more networks. The NMU (506) also detects any new electronic device being added to the one or more networks or availability of higher performance electronic device in near proximity to the one or more networks.

Further, the host access point (402) includes an input/output unit (507) and a communication interface unit (508). The various units are communicatively coupled together through a bus (509). It would be understood that the host access point (402) and the processor (500) may further include various hardware modules/units/components or software modules or a combination of hardware and software modules as necessary for implementing the disclosure.

In accordance with an embodiment the disclosure, the host access point (402) is capable of transferring hotspot session to a target access point. Accordingly, STRDU (404) detects an event or requirement to transfer the hotspot session. The event can be a user-input detected by the processor (500). The event can be unavailability of a network in the host access point (402) detected by the NMU (506). The event can be failure of a functionality or introduction of new functionality detected by the processor (500). The event can be low power in the host access point (402) detected by the PSMU (505). The event can be low memory space in the host access point (402) detected by the processor (500). The event can be availability of a higher performance electronic device in proximity to the host access point (402) detected by the NMU (506).

Upon detecting the event, the TDDU (405) determines and selects the target electronic device S2 (403) as a target access point. The TDDU (405) determines and selects the target electronic device S2 (403) based on various criteria such as pre-configured target access point, runtime determination, characteristics of each of the plurality of electronic devices, and user-input.

In one embodiment, the target electronic device S2 (403) can be one of the plurality of client electronic devices C1 (401-1), C2 (401-2), and C3 (401-3) communicatively coupled with the host access point (402) in the one or more networks. In another embodiment, the target electronic device S2 (403) can be also one of the plurality of electronic devices outside the one or more networks. In one another embodiment, the target electronic device S2 (403) can be also a higher performance electronic device in proximity to the host access point (402). In such embodiment, the TDDU (405) determines and selects the target access point based on characteristics of each of the plurality of electronic devices.

Figure 5B:
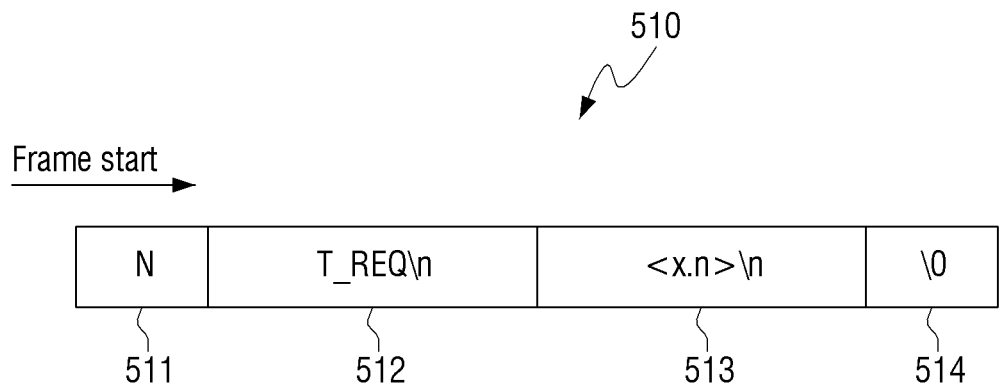
FIGS. 5B, 5C, and 5D illustrate exemplary frame structures transmitted and received by the host access point during transferring of hotspot session, in accordance with an embodiment of the present disclosure.
Figure 5C:
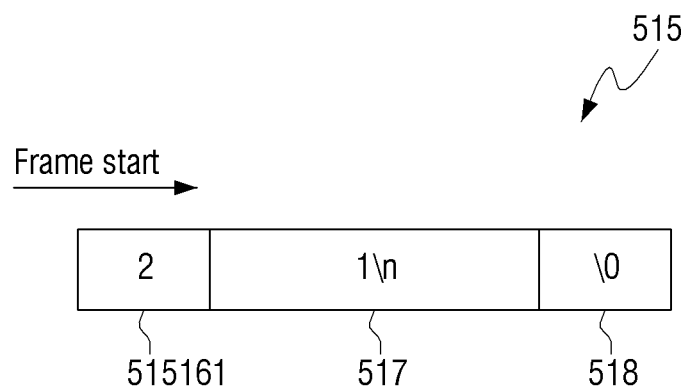
Figure 5D:
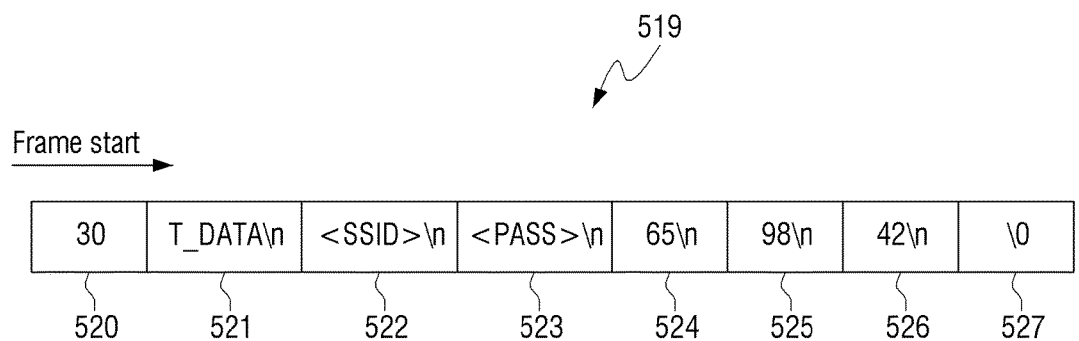

Accordingly, the TDDU (405) sends a request for hotspot session transfer to each of plurality of electronic devices. The request includes protocol list comprising of the one or more communication links active on the host access point (402). Examples of the communication links include, but not limited to, Wireless Fidelity (Wi-Fi), Bluetooth, Bluetooth Low Energy (BLE), Zigbee, Wi-Fi Direct (WFD), and Ultra Wideband (UWB). In one example, the request can be sent using a message frame. FIGS. 5B, 5C, and 5D illustrate exemplary frame structures transmitted and received by the host access point during transferring of hotspot session, in accordance with an embodiment of the present invention.

FIG. 5B illustrates an example request frame sent by the TDDU. Referring to FIG. 5B, the request frame (510) may include a frame size (511), request type (512), protocol list (513), and a terminating character (514).

Upon receiving the request, the SRU (407) in a first set of electronic devices from the plurality of electronic devices transmits an acknowledgement comprising one or more device parameters and a supported protocol list corresponding to each of the first set of electronic devices. The supported protocol list comprises one or more communication links supported by the client electronic device and available in the host access point (402). Thus, the supported protocol list comprises even those links, which are available but are inactive or switched off in the host access point (402). In one example, the acknowledgment can be sent using a message frame. FIG. 5C illustrates an example acknowledgment frame sent by the TDDU. Referring to FIG. 5C, the acknowledgment frame (515) includes a frame size (516), a response character (517), and a terminating character (518). The response character (517) can be character representing either a success response or a failure response.

Upon receiving the acknowledgement, the TDDU (405) selects target electronic device S2 (403) from amongst the first set of electronic devices as the target access point based on the device parameters and the supported protocol list. In one implementation, the TDDU (405) performs the above functions prior to detecting the event during establishment of the connection of the plurality of client electronic devices with the one or more networks. In another implementation, the TDDU (405) performs the above functions during runtime. In one another implementation, the TDDU (405) selects the target electronic device S2 (403) from amongst the first set of electronic devices based first-come-first server basis. In other words, the first electronic device providing the acknowledgment is selected as the target access point.

In another embodiment, the target electronic device S2 (403) can be a preconfigured backup access point. In such embodiment, the TDDU (405) determines and selects the target access point based on preconfigured details.

Further, in one embodiment, the host access point (402) hosts one network based on one communication link. Examples of the communication links include, but not limited to, Wireless Fidelity (Wi-Fi), Bluetooth (BT), Bluetooth Low Energy (BLE), Zigbee, Wi-Fi Direct (WFD), and Ultra Wideband (UWB). In such embodiment, the TDDU (405) determines and selects single target electronic device as target access points.

In another embodiment, the host access point (402) hosts more than one network based on two or more communication links. In such embodiment, the TDDU (405) determines and selects one or more electronic devices as target access points. In an example, the host access point (402) hosts a first network by providing Wi-Fi link to two client electronic devices and a second network by providing BT link to other two client electronic devices. In such example, the TDDU (405) can select one electronic device as target access point capable of hosting a single network by providing Wi-Fi link and BT link. Alternatively, the TDDU (405) can select a first electronic device as target access point capable of hosting the first network by providing Wi-Fi link and a second electronic device as target access point capable of hosting the second network by providing BT link.

Upon determining and selecting the target electronic device S2 (403), the STU (406) sends a request for hotspot session transfer to the target electronic device S2 (403), such that the target electronic device S2 (403) can be configured as a hotspot access point, with the same network configuration data sent by the host access point (402), providing the hotspot session. The request for hotspot session transfer includes network configuration details corresponding to one or more networks based on one or more communication links active on the host access point and supported by the at least one identified electronic device. Further, the STU (406) sends client configuration details corresponding to plurality of client electronic devices communicatively coupled with the host access point (402) in the one or more networks. In addition, the configuration request includes a time period for configuring the target electronic device S2 (403) as the hotspot access point. Additionally, the configuration request includes active firewall rules and exception, proxy server settings, state information of each of the client electronic devices, and pre-stored information of inactive client electronic devices.

In one example, the STU (406) sends the request using a message frame. FIG. 5D illustrates an example request frame sent by the STU, in accordance with an embodiment of the present invention. The request frame (519) includes a frame size (520), a request type (521), name of the network (522) and a network password (523). The name of the network (522) can be SSID. The request frame (519) further includes size of network configuration file (524), size of client configuration file (525), size of rules & proxy data file (526) that are sent after the transmission of the request frame (510). Finally, the request frame (519) includes a terminating character (527).

In one embodiment, the host access point (402) hosts the network based on one communication link. In such embodiment, in one aspect, the target electronic device S2 (403) as illustrated in FIG. 4 can be one of the plurality of client devices commutatively coupled with the host access point (402) in the network. Accordingly, the STU (406) only transmits the configuration request including the time period to the target electronic device S2 (403).

In another aspect, the target electronic device S2 (403) can be outside the network. Accordingly, the STU (406) transmits the request for hotspot session transfer including network configuration details. The network configuration details include network type, name or SSID, password, frequency, channel, and encryption. Upon transmitting the request for hotspot session transfer, the STU (406) transmits the configuration request including the client configuration details. The client configuration details includes device name, MAC address, communication link, frequency of operation, channel of operation, IP allocated, firewall rules, pre-cache key, data limit, location, session information and state such as memory cache, and internet packet exchange state. In addition, the STU (406) transmits other information such as active firewall rules and exceptions, proxy server settings, scheduling information of new hotspot network, and non-connected remembered client information. However, the STU (406) transmits the client configuration details based on preconfigured transfer permission data corresponding to each of the one or more client devices. The transfer permission data can receive from each of the client electronic devices during initial connection with the host access point (402) and saved in the memory of the host access point (402).

In another embodiment, the host access point (402) hosts more than one network based on two or more communication links. In such embodiment, one or more electronic devices are selected as target access point. Accordingly, the STU (406) transmits the request for hotspot session transfer including network configuration details to the one or more target electronic devices. Consequently, the SRU (407) in the target electronic device S2 (403) as illustrated in FIG. 4 acquires the network configuration details and client configuration details sent by the STU (406) of the host access point (402). The SRU (407) in the target electronic device S2 (403) hosts the same one or more networks, with the same network configuration details, as hosted by the host access point (402) and allocates same network parameters to the plurality of client electronic devices.

Upon sending the network configuration details, the host access point (402) disconnects from the network and the network is destroyed. Example of such disconnection includes host access point (402) being powered off. The plurality of client electronic devices coupled to the host access point (402) in the network are connected with the selected target electronic device S2 (403) automatically. Accordingly, the plurality of client electronic devices disconnects from network and search for the same network to re-connect. The plurality of client electronic devices find the target electronic device S2 (403) as new hotspot access point. Since the network configuration details or parameters remain same, the plurality of client electronic devices connect to the network hosted by the target electronic device S2 (403) automatically. Thus, the plurality of client electronic devices has the experience as if the hotspot device network is disconnected and re-connected. In addition, the STU (406) provides a notification on the plurality of client electronic devices indicating the target electronic device S2 (403) as new hotspot access point. Examples of the notification include, but not limited to, a flash message, a push message, and an SMS.

Thus, the host access point (402) performs selection of electronic device as a target access point at run time upon detecting an event or requirement. This eliminates the need for the connected client devices to receive or store information of about other access points for connecting/reconnecting. In addition, this eliminates the need for having multiple active access point in the network.

For the ease of understanding, the forthcoming descriptions of FIGS. 6 to 13 illustrate various implementation manifestations of the disclosure.

Figure 6A:
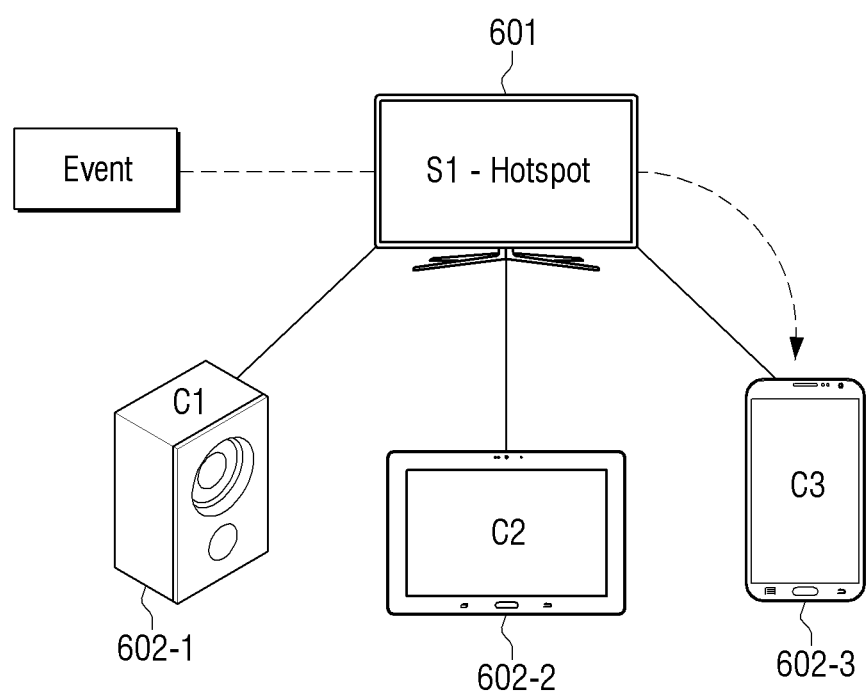
FIGS. 6A and 6B illustrate a first example manifestation of transferring hotspot session, in accordance with an embodiment of the disclosure.
Figure 6B:
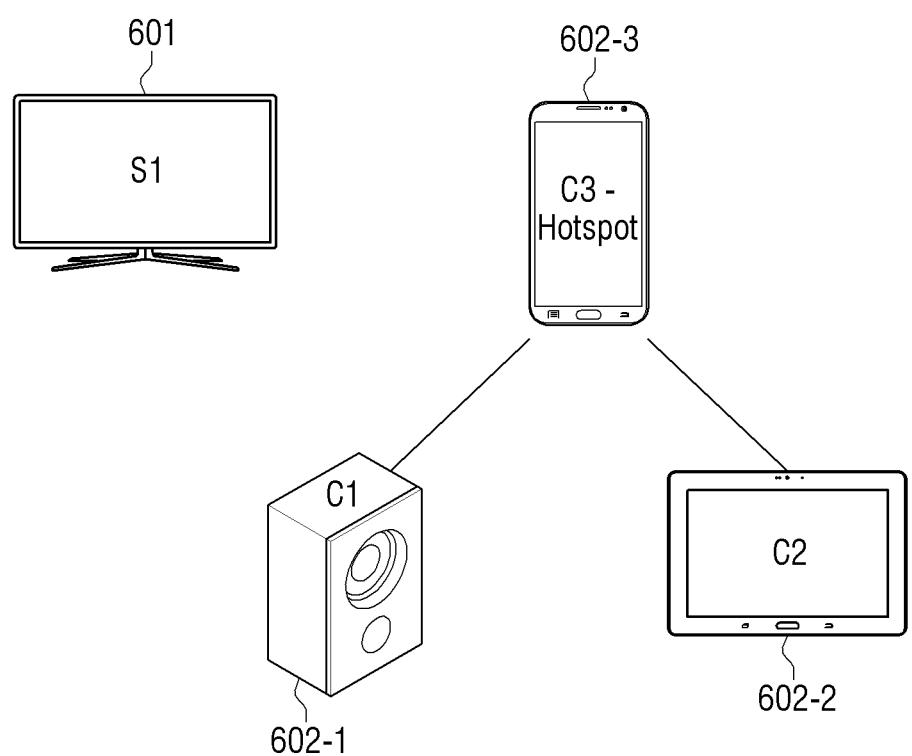

FIGS. 6A and 6B illustrate a first example manifestation of transferring hotspot session, in accordance with an embodiment of the present disclosure. In the example, the hotspot session can be transferred to an electronic device inside hotspot network created from one communication link. FIG. 6A illustrates a sender electronic device S1 acting as a host access point and hosting a hotspot network, in accordance with an embodiment of the present disclosure. Plurality of client electronic devices (602-1, 602-2, 602-3) is communicatively coupled to the sender electronic device S1 (601) via one communication link. For the sake of brevity and ease of understanding, only three client electronic devices C1 (602-1), C2 (602-2), and C3 (602-3) have been illustrated. Further, the sender electronic device S1 (601) includes STRDU (404), TDDU (405) and STU (406) and the client electronic devices includes SRU (407) as described in FIGS. 4 and 5A.

In accordance with an exemplary of the present disclosure, the STRDU (404) in the sender electronic device S1 (601) detects an event or requirement for transferring hotspot session, as described in reference to FIG. 5A above. The event can be a user-input indicating shutting down and powering off the sender electronic device S1 (601) via various methods such as pressing a predefined key on a remote controller. The event can be unavailability of the sender electronic device S1 (601). The event can be unavailability of a network in the sender electronic device S1 (601). The event can be failure of functionality or introduction of new functionality in the sender electronic device S1 (601). The event can be low power in the sender electronic device S1 (601). The event can be low memory space in the sender electronic device S1 (601).

Upon detecting an event corresponding to the transfer of hotspot session, the TDDU (405) in the sender electronic device S1 (601) determines and selects the client electronic device C3 (602-3) as the target access point for creating the hotspot network, as described in reference to FIG. 5A above.

Upon selecting the client electronic device C3 (602-3), the STU (406) in the sender electronic device S1 (601) transmits the request for hotspot session transfer including network configuration details to the client electronic device C3 (602-3), as described in reference to FIG. 5A above. Dashed arrow in FIG. 6A represents the transmission.

Referring to FIG. 6B, upon receiving the network configuration details, the SRU (407) in the client electronic device C3 (602-3) acquires the network configuration details and client configuration details sent by the STU (406) in the sender electronic device S1 (601). The SRU (407) in the client electronic device C3 (602-3) hosts the same network as hosted by the sender electronic device S1 (601) and allocates same network parameters to the plurality of client electronic devices.

Upon sending the network configuration details, the sender electronic device S1 (601) disconnects from the network. The client electronic device C3 (602-3) becomes new hotspot access point. Accordingly, the client electronic devices C1 (602-1) and C2 (602-2) disconnect from the sender electronic device S1 (601) and connect with the client electronic device C3 (602-3) automatically, as described in reference to FIG. 5A above.

Figure 7A:
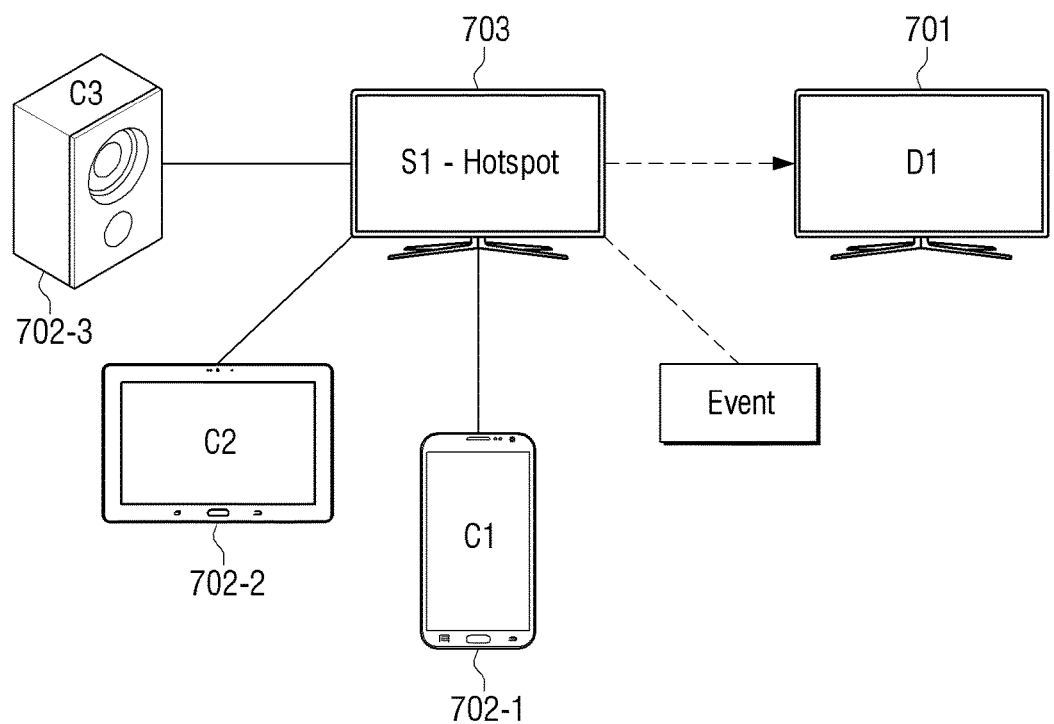
FIGS. 7A and 7B illustrate a second example manifestation of transferring hotspot session, in accordance with an embodiment of the disclosure.
Figure 7B:
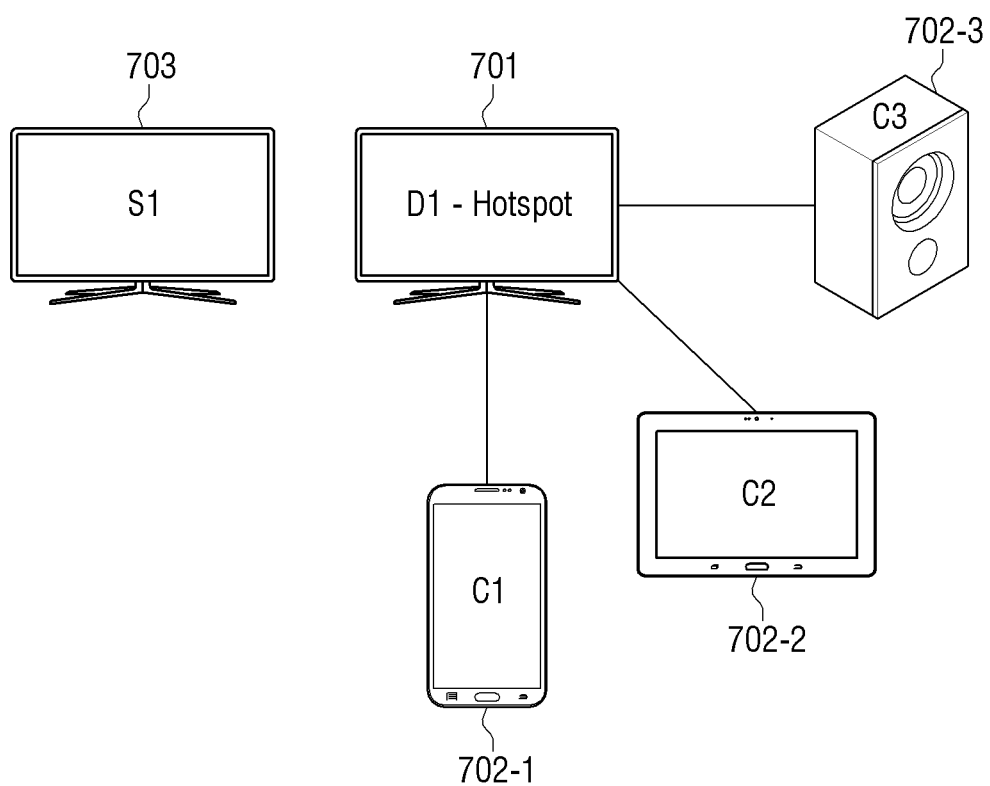

FIGS. 7A and 7B illustrate a second example manifestation of transferring hotspot session, in accordance with an embodiment of the present disclosure. In the example, the hotspot session can be transferred to an electronic device outside hotspot network created from one communication link. FIG. 7A illustrates a sender electronic device S1 acting as a host access point and creating a hotspot network. Plurality of client electronic devices (702-1, 702-2, 702-3) is communicatively coupled to the sender electronic device S1 (701) via one communication link. For the sake of brevity and ease of understanding, only three client electronic devices C1 (702-1), C2 (702-2), and C3 (702-3) have been illustrated.

Further, an electronic device D1 (703) is available outside the hotspot network hosted by the sender electronic device S1 (701) and is capable of providing hotspot network. In addition, the electronic device D1 (703) can be in near proximity to the sender electronic device S1 (701). Further, the sender electronic device S1 (701) includes STRDU (404), TDDU (405) and STU (406), and the electronic device D1 (703) includes SRU (407) as illustrated in FIG. 4 and FIG. 5A.

In accordance with the present disclosure, the STRDU (404) in the sender electronic device S1 (701) detects an event or requirement for transferring hotspot session, as described in reference to FIG. 5A above. The event can be a user-input indicating shutting down and powering off the sender electronic device S1 (701) via various methods such as pressing a predefined key on a remote controller. The event can be unavailability of a network in the sender electronic device S1 (701). The event can be failure of functionality in the sender electronic device S1 (701). The event can be introduction of new or prime functionality in the sender electronic device S1 (701) or the electronic device D1 (703). The event can be low power in the sender electronic device S1 (701). The event can be low memory space in the sender electronic device S1 (701).

Upon detecting an event corresponding to the transfer of hotspot session, the TDDU (405) in the sender electronic device S1 (701) determines and selects the electronic device D1 (703) outside the network as the target access point for creating the hotspot network, as described in reference to FIG. 5A above.

Upon selecting the electronic device D1 (703), the STU (406) in the sender electronic device S1 (701) transmits the request for hotspot session transfer including network configuration details to the electronic device D1 (703), as described in reference to FIG. 5A above. The network configuration details include network type, name or SSID, password, frequency, channel, and encryption. Dashed arrow in FIG. 7A represents the transmission. In addition, the STU (406) in the sender electronic device S1 (701) transmits client configuration details, as described in reference to FIG. 5A above, since the electronic device D1 (703) is outside the hotspot network.

Referring to FIG. 7B, the SRU (407) in the electronic device D1 (703) acquires the network configuration details and client configuration details sent by the STU (406) in the sender electronic device S1 (701). The SRU (407) in the electronic device D1 (703) hosts the same network as hosted by the sender electronic device S1 (701) and allocates same network parameters to the plurality of client electronic devices C1 (702-1), C2 (702-2), and C3 (702-3).

Upon sending the network configuration details, the sender electronic device S1 (701) disconnects from the network. The electronic device D1 (703) becomes new hotspot access point. Accordingly, the client electronic devices C1 (702-1), C2 (702-2), and C3 (702-3) disconnect from the sender electronic device S1 (701) and connect with the selected the electronic device D1 (703) automatically, as described in reference to FIG. 5A above.

Figure 8A:
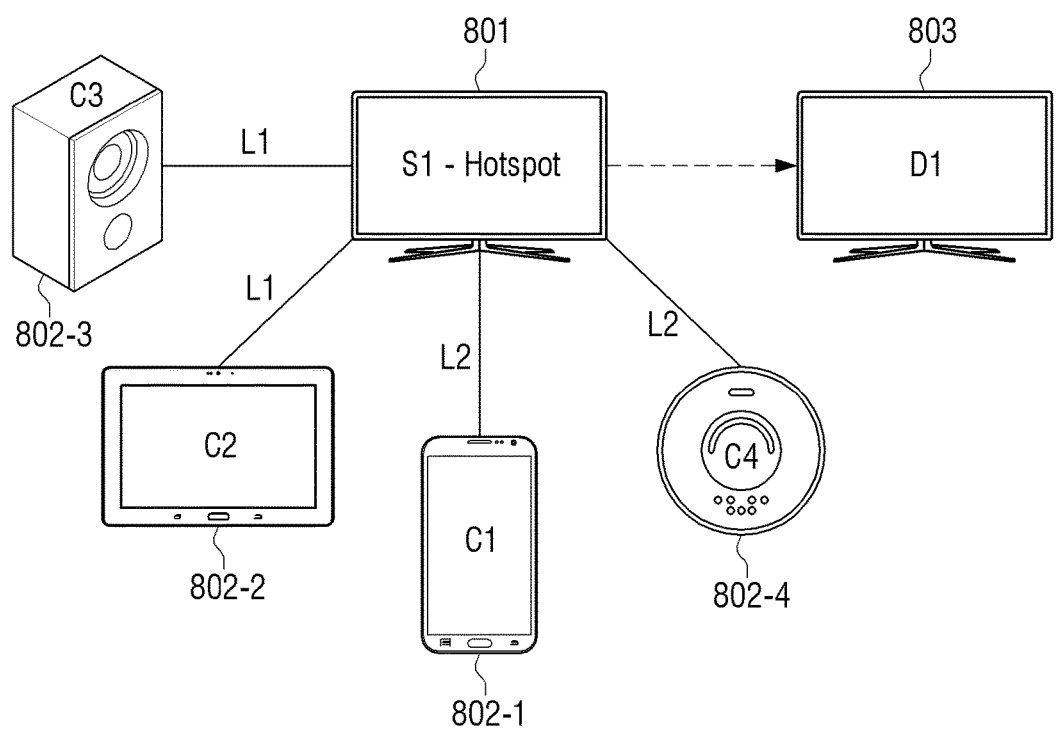
FIGS. 8A and 8B illustrate a third example manifestation of transferring hotspot session, in accordance with an embodiment of the disclosure.
Figure 8B:
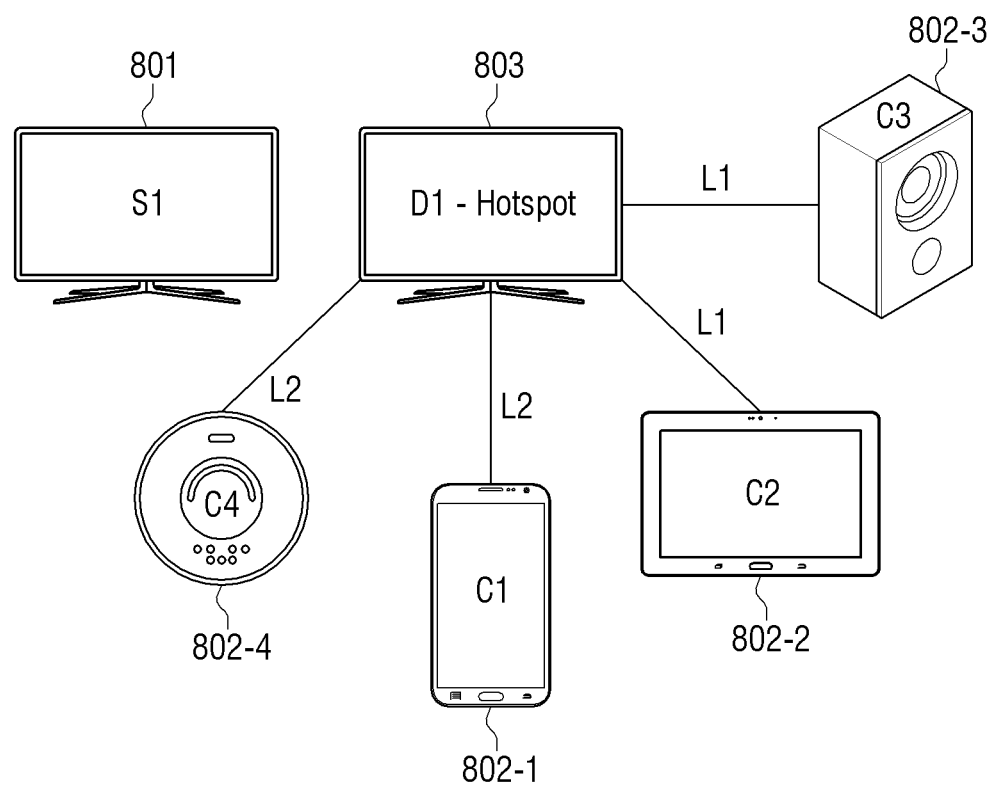

FIGS. 8A and 8B illustrate a third example manifestation of transferring hotspot session, in accordance with an embodiment of the present disclosure. In the example, two or more hotspot networks are created from two or more links and the hotspot session can be transferred to an electronic device. FIG. 8A illustrates a sender electronic device S1 acting as a host access point and creating two or more hotspot networks. For the sake of brevity and ease of understanding, only two networks creating using two links are illustrated. Further, plurality of client electronic devices (802-1, 802-2, 802-3, 802-4) is communicatively coupled to the sender electronic device S1 (801) via two or more communication links. For the sake of brevity and ease of understanding, only four client electronic devices C1 (802-1), C2 (802-2), C3 (802-3), and C4 (802-4) have been illustrated. Further, the client electronic devices C2 (802-2) and C3 (802-3) are connected via communication link L1 to the first hotspot network. Similarly, the client electronic devices C1 (802-1) and C4 (802-4) are connected via communication link L2 to the second hotspot network.

Further, an electronic device D1 (803) is available in near proximity to the sender electronic device S1 (801) and is capable of providing more than one hotspot network. In one implementation, the electronic device D1 (803) can be outside the hotspot networks hosted by the sender electronic device S1 (801). In another implementation, the electronic device D1 (803) can be within the hotspot networks hosted by the sender electronic device S1 (801). Further, the sender electronic device S1 (801) includes STRDU (404), TDDU (405) and STU (406) and the electronic device D1 (803) includes SRU (407) as described in FIGS. 4 and 5A.

In accordance with the present disclosure, the STRDU (404) in the sender electronic device S1 (801) detects an event or requirement for transferring hotspot session, as described in reference to FIG. 5A above. The event can be a user-input indicating shutting down and powering off the sender electronic device S1 (801) via various methods such as pressing a predefined key on a remote controller. The event can be unavailability of a network in the sender electronic device S1 (801). The event can be failure of functionality in the sender electronic device S1 (801). The event can be introduction of new or prime functionality in the sender electronic device S1 (801) or the electronic device D1 (803). The event can be low power in the sender electronic device S1 (801). The event can be low memory space in the sender electronic device S1 (801). The event can be availability of higher performance electronic device such the electronic device D1 (803).

Upon detecting an event corresponding to the transfer of hotspot session, the TDDU (405) in the sender electronic device S1 (801) determines and selects the electronic device D1 (803) as the target access point for creating the hotspot networks, as described in reference to FIG. 5A above.

Upon selecting the electronic device D1 (803), the STU (406) in the sender electronic device S1 (801) transmits the request for hotspot session transfer including network configuration details to the electronic device D1 (803), as described in reference to FIG. 5A above. Dashed arrow in the figure represents the transmission. The network configuration details can be sent for all the networks, i.e., for the first network created using link L1 and the second network created using link L2, and includes network type, name or SSID, password, frequency, channel, and encryption. In addition, the STU (406) in the sender electronic device S1 (601) transmits client configuration details, as described in reference to FIG. 5A above, if the electronic device D1 (803) can be outside the hotspot networks.

Referring to FIG. 8B, upon receiving the network configuration details, the SRU (407) in the electronic device D1 (803) acquires the network configuration details and client configuration details sent by the STU (406) the sender electronic device S1 (801). The SRU (407) in the electronic device D1 (803) hosts the same networks as hosted by the sender electronic device S1 (801) with the communication links L1 and L2. Further, the SRU (407) in the electronic device D1 (803) allocates same network parameters to the plurality of client electronic devices C1 (802-1), C2 (802-2), C3 (802-3), and C4 (802-4).

Upon sending the network configuration details, the sender electronic device S1 (801) disconnects from the network. The electronic device D1 (803) becomes new hotspot access point hosting two hotspot networks with links L1 and L2. Accordingly, the client electronic devices C1 (802-1), C2 (802-2), C3 (802-3), and C4 (802-4) disconnect from the sender electronic device S1 (801) and connect with the selected the electronic device D1 (803) automatically, as described in reference to FIG. 5A above. Thus, the client electronic devices C2 (802-2) and C3 (802-3) are connected via communication link L1 to the first hotspot network hosted by the electronic device D1 (803). Similarly, the client electronic devices C1 (802-1) and C4 (802-4) are connected via communication link L2 to the second hotspot network hosted by the electronic device D1 (803).

Figure 9A:
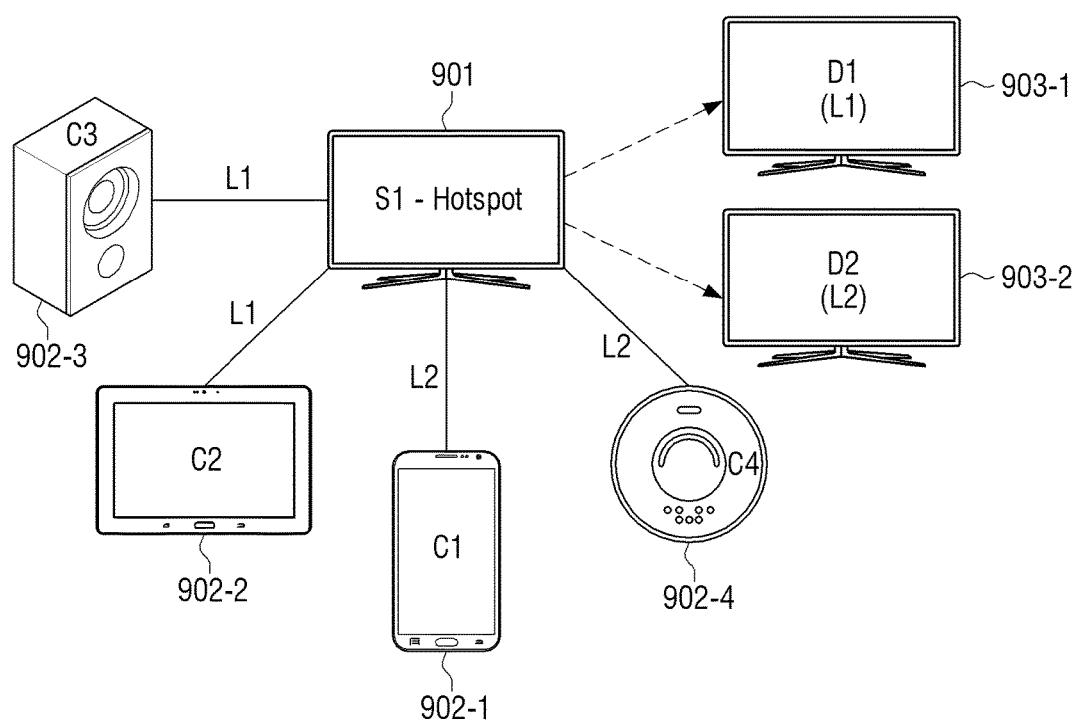
FIGS. 9A and 9B illustrate a fourth example manifestation of transferring hotspot session, in accordance with an embodiment of the disclosure.
Figure 9B:
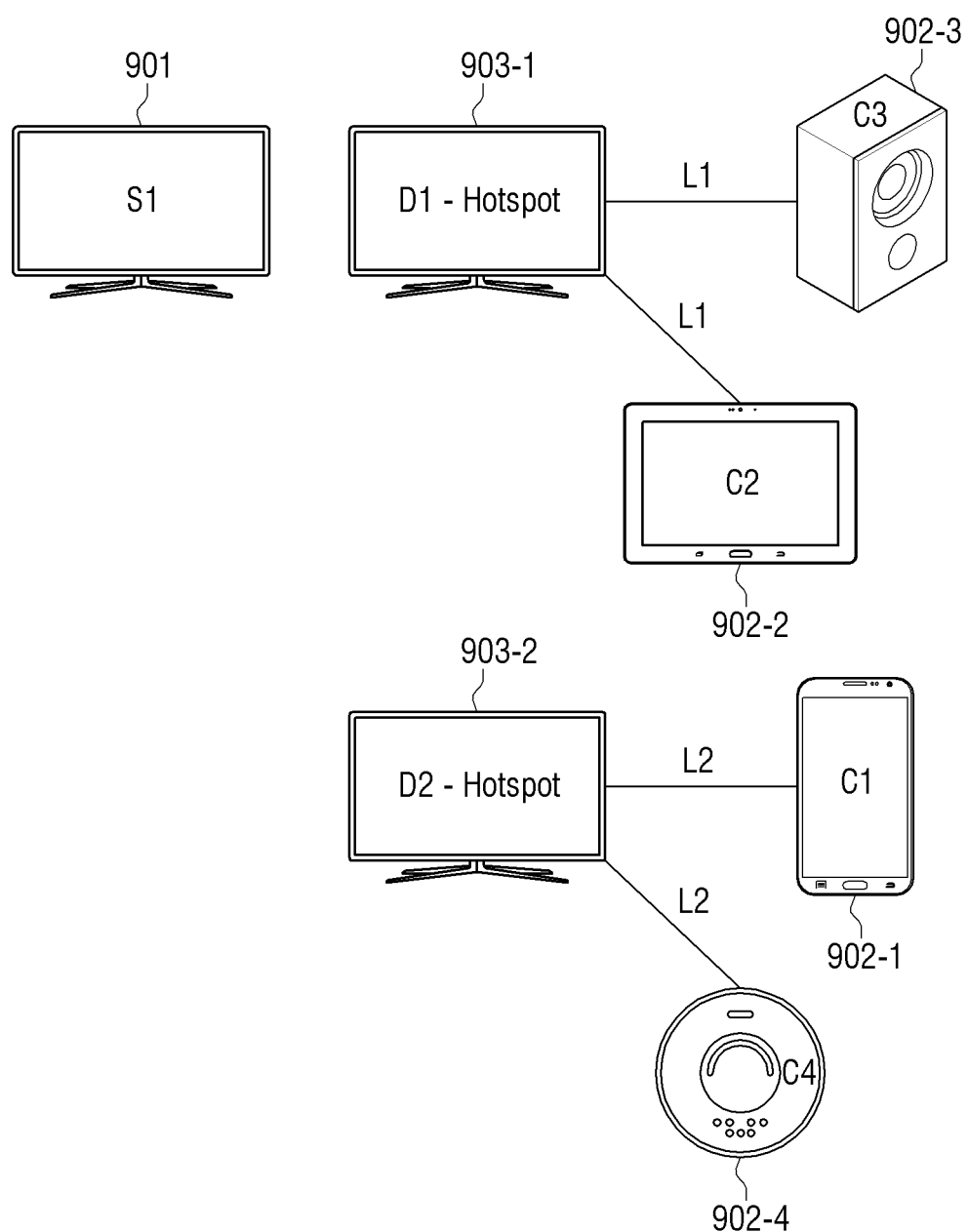

FIGS. 9A and 9B illustrate a fourth example manifestation of transferring hotspot session, in accordance with an embodiment of the present disclosure. In the example, hotspot networks are created from two or more links and the hotspot session is transferred to two or more electronic devices. FIG. 9A illustrates a sender electronic device S1 acting as host access point and hosting two or more hotspot networks. For the sake of brevity and ease of understanding, only two networks creating using two links are illustrated. Further, plurality of client electronic devices (902-1, 902-2, 902-3, 902-4) can be communicatively coupled to the sender electronic device S1 (901) via two more communication links. For the sake of brevity and ease of understanding, only four client electronic devices C1 (902-1), C2 (902-2), C3 (902-3), and C4 (902-4) have been illustrated. Further, the client electronic devices C2 (902-2) and C3 (902-3) are connected via communication link L1 to the first hotspot network. Similarly, the client electronic devices C1 (902-1) and C4 (902-4) are connected via communication link L2 to the second hotspot network.

Further, a plurality of an electronic device (903-1, 903-2) are available in near proximity to the sender electronic device S1 (901) and can be capable of providing hotspot networks. In one implementation, the electronic device (903-1, 903-2) can be outside the hotspot networks hosted by the sender electronic device S1 (901). In another implementation, the electronic device (903-1, 903-2) can be within the hotspot networks hosted by the sender electronic device S1 (901). For the sake of brevity and ease of understanding, only two electronic devices D1 (903-1) and D2 (903-2) have been illustrated. Further, the sender electronic device S1 (901) includes STRDU (404), TDDU (405) and STU (406) and the electronic devices D1 (903-1) and D2 (903-2) include SRU (407) as described in FIGS. 4 and 5A.

In accordance with the disclosure, the STRDU (404) in the sender electronic device S1 (901) detects an event or requirement for transferring hotspot session, as described in reference to FIG. 5A above. The event can be a user-input indicating shutting down and powering off the sender electronic device S1 (901) via various methods such as pressing a predefined key on a remote controller. The event can be unavailability of a network in the sender electronic device S1 (901). The event can be failure of functionality in the sender electronic device S1 (901). The event can be introduction of new or prime functionality in the sender electronic device S1 (901) or the electronic device D1 (903-1). The event can be low power in the sender electronic device S1 (901). The event can be low memory space in the sender electronic device S1 (901). The event can be availability of higher performance electronic device such the electronic device D1 (903-1).

Upon detecting an event corresponding to the transfer of hotspot session, the TDDU (405) in the sender electronic device S1 (901) determines and selects the electronic devices D1 (903-1) and D2 (903-2) as the target access points for creating two hotspot networks, as described in reference to FIG. 5A above. Thus, in the present example, the TDDU (405) selects the electronic device D1 (903-1) for hosting a first hotspot network with communication link L1. Similarly, the TDDU (405) selects the electronic device D2 (903-2) for hosting a second hotspot network with communication link L2.

Upon selecting the electronic devices D1 (903-1) and D2 (903-2), the STU (406) in the sender electronic device S1

(901) transmits the request for hotspot session transfer including network configuration details to the electronic devices D1 (903-1) and D2 (903-2), as described in reference to FIG. 5A above. Dashed arrows in the figure represent the transmission. The network configuration details can be sent for the first network created using the link L1 to the electronic device D1 (903-1), and includes network type, name or SSID, password, frequency, channel, and encryption. The network configuration details can be sent for the second network created using the link L2 to the electronic device D2 (903-2), and includes network type, name or SSID, password, frequency, channel, and encryption. In addition, the STU (406) in the sender electronic device S1 (901) transmits client configuration details, as described in reference to FIG. 5A above.

Referring to FIG. 9B, upon receiving the network configuration details, the SRU (407) in the electronic device D1 (903-1) acquires the network configuration details and client configuration details sent by the STU (406) in the sender electronic device S1 (901). The SRU (407) in the electronic device D1 (903-1) hosts the same first network as hosted by the sender electronic device S1 (901) with the communication link L1. Further, the SRU (407) in the electronic device D1 (903-1) allocates same network parameters to the client electronic devices C2 (902-2) and C3 (902-3). Similarly, upon receiving the network configuration details, the SRU (407) in the electronic device D2 (903-2) acquires the network configuration details and client configuration details sent by the STU (406) in the sender electronic device S1 (901). The SRU (407) in the electronic device D1 (903-2) hosts the same second network as hosted by the sender electronic device S1 (901) with the communication link L2. Further, the SRU (407) in the electronic device D1 (903-2) allocates same network parameters to the client electronic devices C1 (902-1) and C4 (902-4).

Upon sending the network configuration details, the sender electronic device S1 (901) disconnects from the network. The electronic device D1 (903-1) becomes new hotspot access point hosting the first hotspot network with link L1 and the electronic device D2 (903-2) becomes new hotspot access point hosting the second hotspot network with link L2. Accordingly, the client electronic devices C1 (902-1), C2 (902-2), C3 (902-3), and C4 (902-4) disconnect from the sender electronic device S1 (901) and connect with the electronic devices D1 (903-1) and D2 (903-2) automatically, as described in reference to FIG. 5A above. Thus, the client electronic devices C2 (902-2) and C3 (902-3) are connected via communication link L1 to the first hotspot network hosted by the electronic device D1 (903-1). Similarly, the client electronic devices C1 (902-1) and C4 (902-4) are connected via communication link L2 to the second hotspot network hosted by the electronic device D2 (903-2).

Thus, if one electronic device is not available to support all networks with active communication links, a host access point can transfer the hotspot session to multiple electronic devices capable of supporting at least one of the networks with active communication link. This eliminates the dependency on an availability of a single electronic device capable of providing the network since more than one electronic device can become access points enabling access to the network by all connected client devices.

Figure 10A:
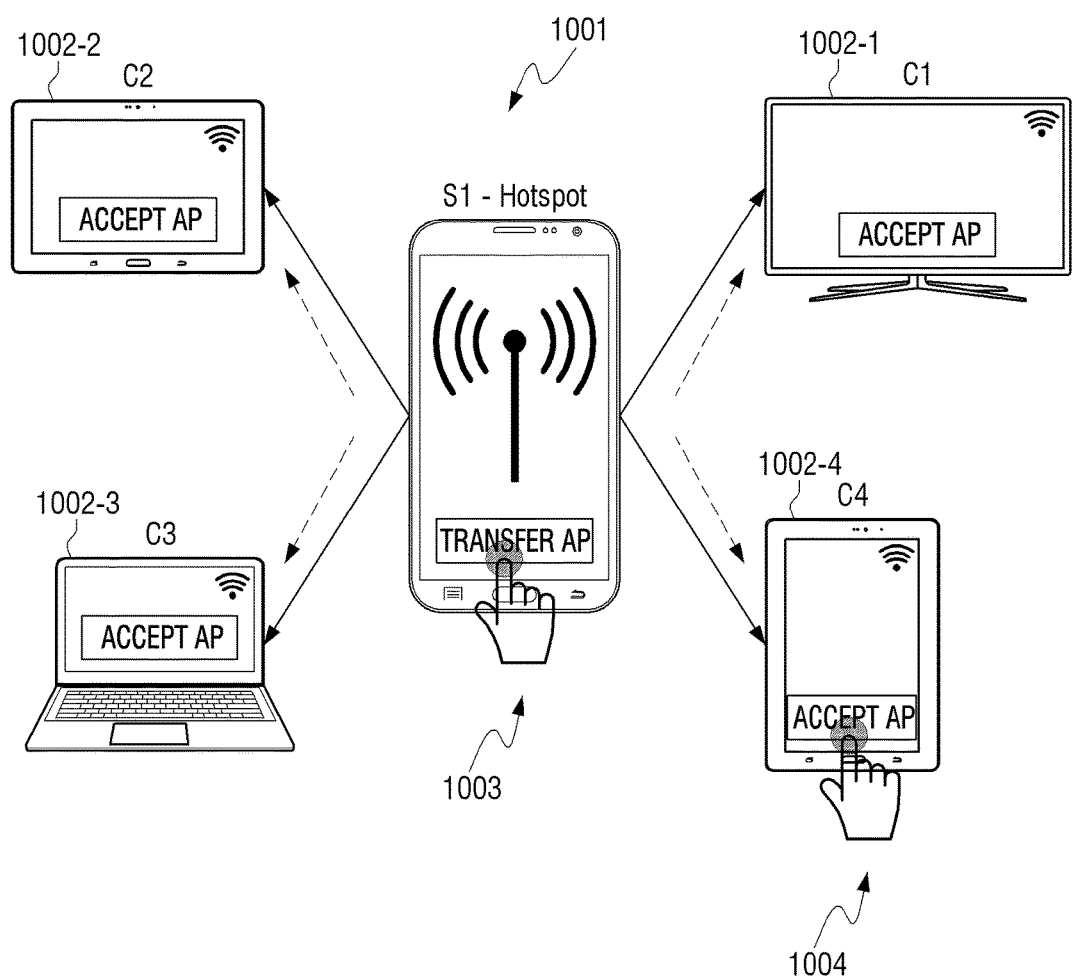
FIGS. 10A and 10B illustrate a fifth example manifestation of transferring hotspot session, in accordance with an embodiment of the disclosure.
Figure 10B:
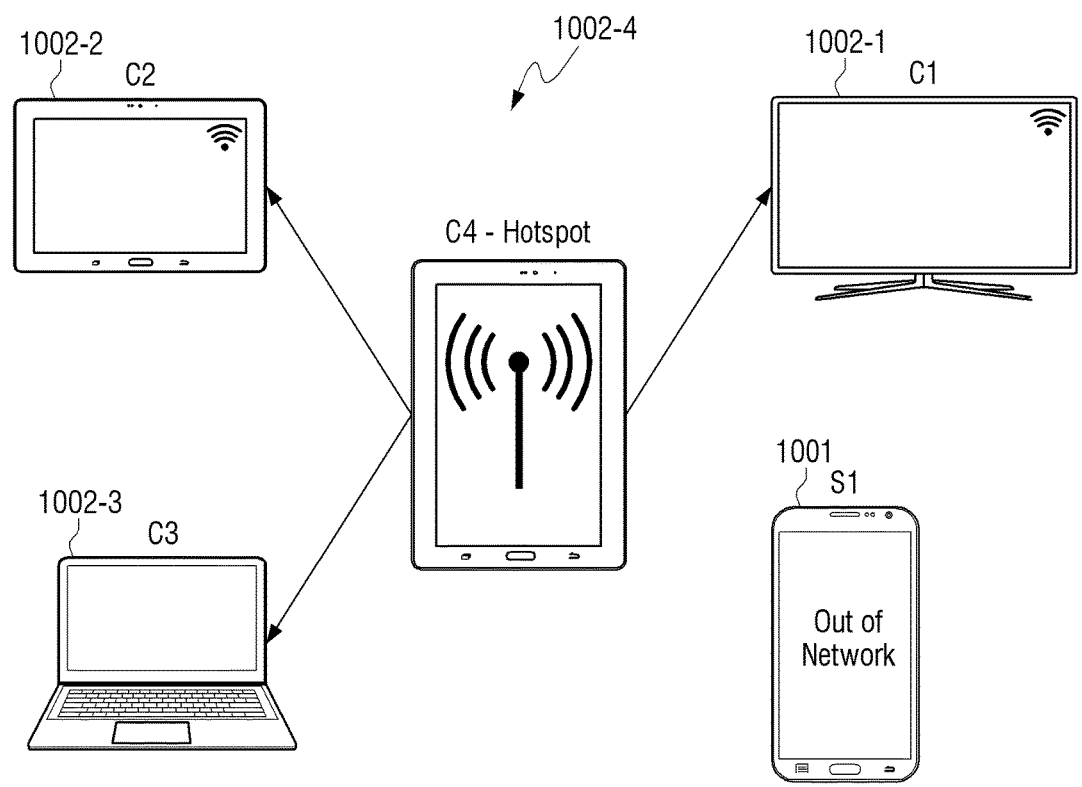

FIGS. 10A and 10B illustrate a fifth example manifestation of transferring hotspot session, in accordance with an embodiment of the present disclosure. In the example, the hotspot session is transferred to an electronic device upon receiving a request from a user. Accordingly, FIG. 10A illustrates a sender electronic device S1 acting as a host access point and hosting one or more hotspot networks. Plurality of client electronic devices (1002-1, 1002-2, 1002-3, 1002-4) can be communicatively coupled to the sender electronic device S1 (1001) via one or more communication links. For the sake of brevity and ease of understanding, only four client electronic devices C1 (1002-1), C2 (1002-2), C3 (1002-3), and C4 (1002-4) have been illustrated. Further, the sender electronic device S1 (1001) includes STRDU (404), TDDU (405) and STU (406) and the client electronic devices includes SRU (407) as described in FIGS. 4 and 5A.

In accordance with the present disclosure, the STRDU (404) in the sender electronic device S1 (1001) detects an event or requirement for transferring hotspot session, as described in reference to FIG. A above. The event is a user-input (1003) indicating transfer of hotspot access point. Accordingly, the user may access a user-interface (not shown in the figure) corresponding to hotspot settings on the sender electronic device S1 (1001). The user-interface may include text portion indicating current hotspot session details and network details. The user-interface may also include user-selectable items for activating various links for accessing the one or more hotspot networks. The user-interface may also include user-selectable item to transfer the hotspot session. Upon accessing the user-selectable item, the STRDU (404) detects the event for transferring hotspot session.

Upon detecting an event corresponding to the transfer of hotspot session, the TDDU (405) in the sender electronic device S1 (1001) determines and selects the client electronic device C4 (1002-4) as the target access point for creating the hotspot network, as described in reference to FIG. 5A above. Accordingly, in the example, the TDDU (405) sends request to transferring hotspot session to each of the plurality of client electronic devices C1 (1002-1), C2 (1002-2), C3 (1002-3), and C4 (1002-4). Dashed arrows in the figure represent the transmission. Upon receiving an acknowledgement, the TDDU (405) selects the client electronic device C4 (1002-4) for transferring hotspot session. In one implementation, the TDDU (405) selects the client electronic device C4 (1002-4) upon receiving the acknowledgment on First-Come-First Service basis. In other implementation, the TDDU (405) selects the client electronic device C4 (1002-4) based on device parameters and protocols of communication links supported by the client electronic device C4 (1002-4). In one another implementation, TDDU (405) selects the client electronic device C4 (1002-4) based on displaying potential options to the user via the user interface on the sender electronic device S1 (1001) and receiving a selection of the client electronic device C4 (1002-4).

Upon selecting the client electronic device C4 (1002-4), the STU (406) in the sender electronic device S1 (1001) transmits the request for hotspot session transfer including network configuration details to the client electronic device C4 (1002-4), as described in reference to FIG. 5A above.

Upon receiving the network configuration details, the SRU (407) in the client electronic device C4 (1002-4) acquires the network configuration details and client configuration details sent by the STU (406) in the sender electronic device S1 (1001) in response to user-input (1004). The user-input (1004) indicates acceptance of a user of the client electronic device C4 (1002-4) to be hotspot access point. Accordingly, a notification (not shown in the figure) can be provided on the client electronic device C4 (1002-4). The notification may include text portion indicating request for transferring hotspot session. The notification may also include user-selectable item for accepting transfer of the hotspot session. Upon accessing the user-selectable item, the SRU (407) hosts the same one or more networks as hosted by the sender electronic device S1 (1001) and allocates same network parameters to the plurality of client electronic devices.

Referring to FIG. 10B, upon sending the network configuration details, the sender electronic device S1 (1001) disconnects from the one or more networks. The client electronic device C4 (1002-4) becomes new hotspot access point. Accordingly, the client electronic devices C1 (1002-1), C2 (1002-2), and C3 (1002-3) disconnect from the sender electronic device S1 (1001) and connect with the selected the client electronic device C4 (1002-3) automatically, as described in reference to FIG. 5A above.

Figure 11:
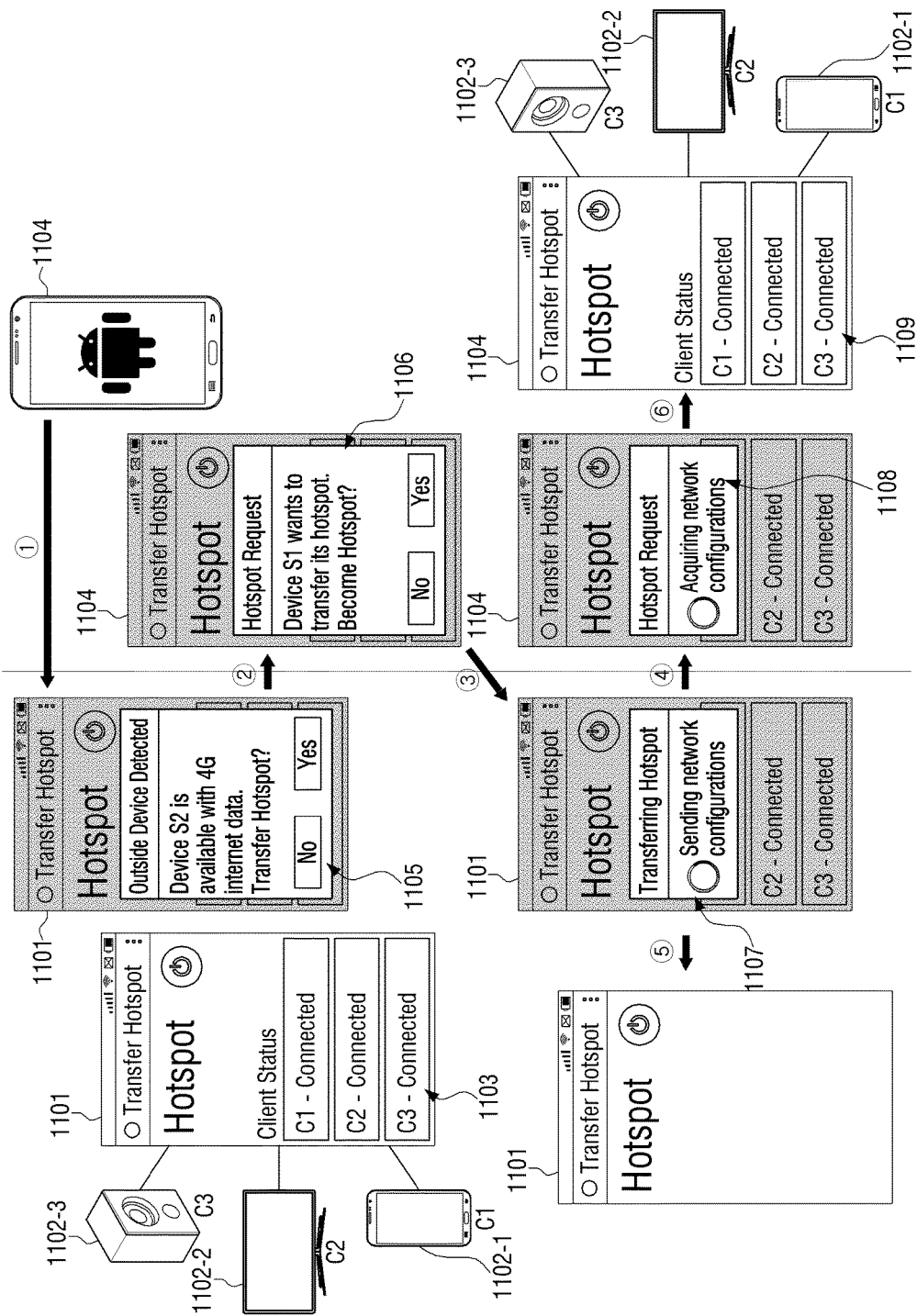
FIG. 11 illustrates a sixth example manifestation of transferring hotspot session, in accordance with an embodiment of the disclosure.

FIG. 11 illustrates a sixth example manifestation of transferring hotspot session, in accordance with an embodiment of the disclosure. In the example, the hotspot session is transferred to an electronic device recommended by hotspot access point. Accordingly, FIG. 11 illustrates a sender electronic device S1 acting as a host access point and hosting one or more hotspot networks. Plurality of client electronic devices (1102) can be communicatively coupled to the sender electronic device S1 (1101) via one or more communication links. For the sake of brevity and ease of understanding, only three client electronic devices C1 (1102-1), C2 (1102-2), and C3 (1102-3) have been illustrated. Further, the sender electronic device S1 (1101) includes STRDU (404), TDDU (405) and STU (406).

Further, the sender electronic device S1 (1101) includes a user-interface (1103) corresponding to hotspot settings. The user-interface (1103) may include text portion indicating current hotspot session details, network details, and client status details indicating connected or not.

In accordance with the disclosure, the STRDU (404) in the sender electronic device S1 (1101) detects an event or requirement for transferring hotspot session, as described in reference to FIG. 5A above. In the example, the event is availability of higher performance or functionality electronic device S2 (1104), capable of hosting one or more hotspot networks, in near proximity to the sender electronic device S1 (1101). In an example, the high performance or functionality is capability of providing high speed data connection such as 4G.

Upon detecting the event corresponding to the transfer of hotspot session, the TDDU (405) in the sender electronic device S1 (1101) provides a notification (1105) on the sender electronic device S1 (1101) (represented by arrow 1). The notification (1105) may include text portion indicating availability of the electronic device S2 (1104) in proximity. The notification (1105) may also include user-selectable item to transfer the hotspot session. Upon accessing the user-selectable item, the TDDU (405) selects the electronic device S2 (1104) as the target access point for hosting the one or more hotspot networks, as described in reference to FIG. 5A above.

Upon selecting the device S2 (1104), the TDDU (405) in the sender electronic device S1 (1101) transmits the request for hotspot session transfer to the electronic device S2 (1104) (represented by arrow 2).

Upon receiving the request, the SRU (407) in the electronic device S2 (1104) receives the request for hotspot session transfer by the sender electronics device S1 (1101). Accordingly, the SRU (407) in the electronic device S2 (1104) provides a notification (1106) on the electronic device S2 (1104). The notification (1106) may include text portion indicating request for transferring hotspot session. The notification (1106) may also include user-selectable item for accepting transfer of the hotspot session. Upon accessing the user-selectable item, the SRU (407) transmits an acknowledgment to the STU (406) in the sender electronics device S1 (1101) for transmitting the network configuration details (represented by arrow 3).

Upon receiving the acknowledgment, the STU (406) in the sender electronic device S1 (1101) transmits network configuration details to the electronic device S2 (1104) (represented by arrow 4), as described in reference to FIG. 5 above. The STU (406) may also provide a notification (1107) indicating transferring of the network configuration details on the sender electronic device S1 (1101). In addition, the STU (406) in the sender electronic device S1 (1101) transmits client configuration details, as described in reference to FIG. 5 above, if the electronic device S2 (1104) is outside the hotspot network.

Upon receiving the network configuration details, the SRU (407) in the electronic device S2 (1104) acquires the network configuration details and client configuration details sent by the STU (406) in the sender electronics device S1 (1101). The SRU (407) in the electronic device S2 (1104) may also provide a notification (1108) indicating acquiring of the network configuration details on the electronic device S2 (1104). Upon acquiring the network configuration details, the SRU (407) in the electronic device S2 (1104) hosts the same network as hosted by the sender electronic device S1 (1101) and allocates same network parameters to the plurality of client electronic devices (1102-1, 1102-2, 1102-3).

Upon sending the network configuration details, the sender electronic device S1 (1101) disconnects from the network (represented by arrow 5). The electronic device S2 (1104) becomes new hotspot access point. Accordingly, the client electronic devices C1 (1002-1), C2 (1002-2), and C3 (1002-3) disconnect from the sender electronic device S1 (1101) and connect with the electronic device S2 (1104) automatically (represented by arrow 6), as described in reference to FIG. 5A above.

Further, the electronic device S2 (1104) includes a user-interface (1109) corresponding to hotspot settings. The user-interface (1109) may include text portion indicating current hotspot session details, network details, and client status details indicating connected or not. On the other hand, the user-interface (1103) corresponding to hotspot settings of sender electronic device S1 (1101) indicates the client electronic devices C1 (1002-1), C2 (1002-2), and C3 (1002-3) are disconnected from the sender electronic device S1 (1101).

Figure 12:
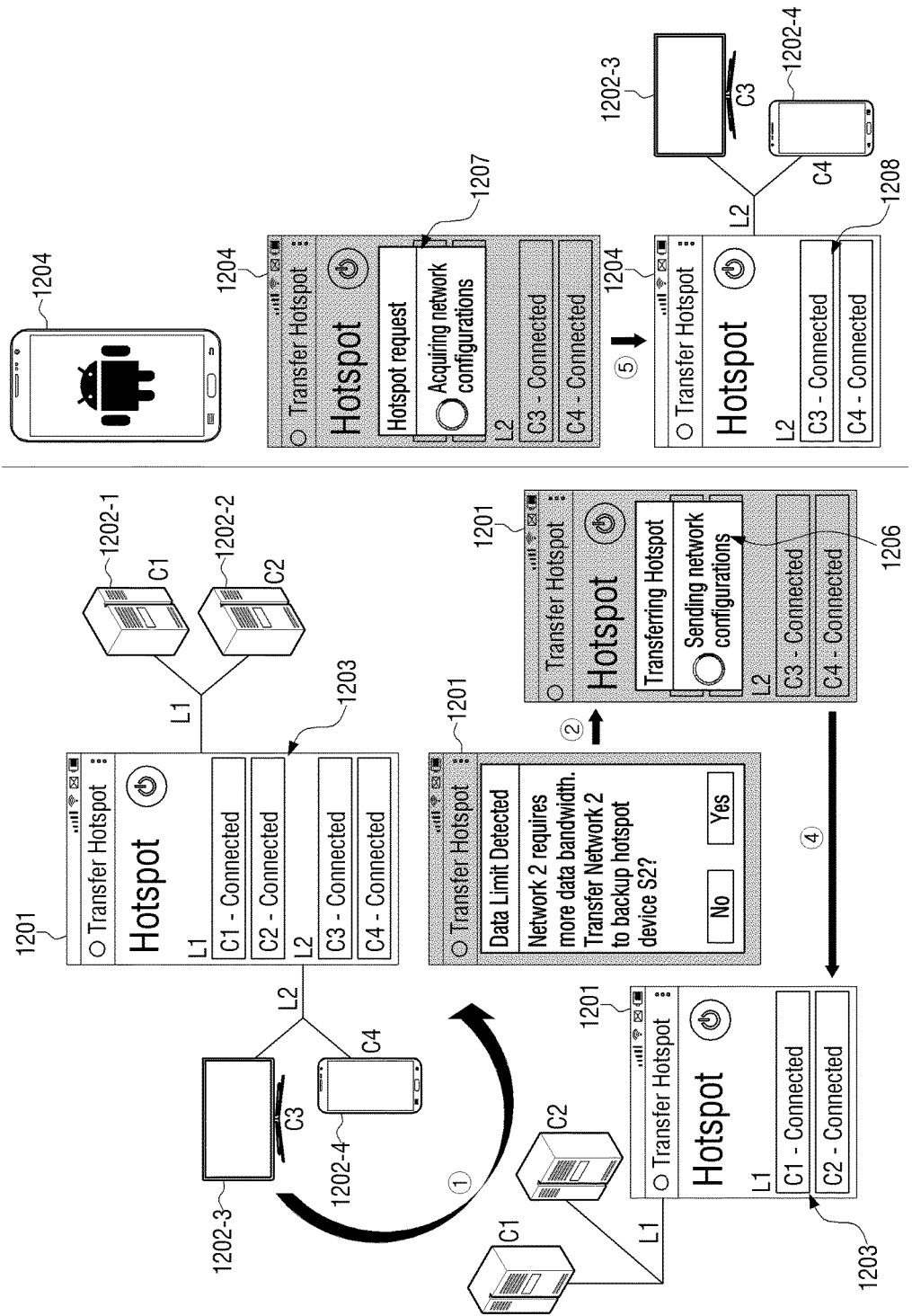
FIG. 12 illustrates a seventh example manifestation of transferring hotspot session, in accordance with an embodiment of the disclosure.

FIG. 12 illustrates a seventh example manifestation of transferring hotspot session, in accordance with an embodiment of the present disclosure. In the example, the hotspot session is transferred to an electronic device recommended by the host access point. Accordingly, FIG. 12 illustrates a sender electronic device S1 acting as a host access point and hosting one or more hotspot networks. Plurality of client electronic devices (1202-1, 1202-2, 1202-3, 1202-4) can be communicatively coupled to the sender electronic device S1 (1201) via one or more communication links. For the sake of brevity and ease of understanding, only four client electronic devices C1 (1202-1), C2 (1202-2), C3 (1202-3), and C4 (1202-4) have been illustrated. Further, the client electronic devices C1 (1202-1) and C2 (1202-2) are connected via communication link L1 to a first hotspot network hosted by the sender electronic device S1 (1201). Similarly, the client electronic devices C3 (1202-3) and C4 (1202-4) are connected via communication link L2 to a second hotspot network hosted by the sender electronic device S1 (1201).

Further, the sender electronic device S1 (1201) includes a user-interface (1203) corresponding to hotspot settings. The user-interface (1203) may include text portion indicating current hotspot session details, network details, and client status details indicating connected or not.

In accordance with the disclosure, the STRDU (404) in the sender electronic device S1 (1201) detects an event or requirement for transferring hotspot session, as described in reference to FIG. 5A above. The event is requirement of functionality such as high data bandwidth and exceeding data limit by one or more of the client electronic devices. In an example, the requirement of functionality is detected for client electronic devices C1 (1202-1) and C2 (1202-2).

Upon detecting the event corresponding to the transfer of hotspot session, the TDDU (405) in the sender electronic device S1 (1201) detects an electronic device S2 (1204) for providing the required functionality. The electronic device S2 (1204) can be a preconfigured backup access point. In one implementation, the electronic device S2 (1204) is configured as backup access point during connection establishment of each of the client electronic devices with the sender electronic device S1 (1201). In another implementation, the electronic device S2 (1204) is configured as backup access point during runtime after analyzing the capabilities of each of the client electronic devices. In such implementation, the parameters such as supported communication links active on host access point, network bandwidth, power source of target device, and latency are assessed.

Accordingly, the TDDU (405) provides a notification (1205) on the sender electronic device S1 (1201) (represented by arrow 1). The notification (1205) may include text portion indicating the requirement and availability of the electronic device S2 (1204). The notification (1205) may also include user-selectable item to transfer the hotspot session. Upon accessing the user-selectable item, the TDDU (405) selects the electronic device S2 (1204) as the target access point for creating the hotspot network, as described in reference to FIG. 5A above.

Upon selecting the electronic device S2 (1204), the STU (406) in the sender electronic device S1 (1201) transmits the request for hotspot session transfer including network configuration details to the electronic device S2 (1204) (represented by arrows 2 & 3), as described in reference to FIG. 5A above. The STU (406) may also provide a notification (1206) indicating transferring of the network configuration details on the sender electronic device S1 (1201). In addition, the STU (406) in the sender electronic device S1 (1201) transmits client configuration details, as described in reference to FIG. 5A above, as the electronic device S2 (1204) can be outside the hotspot network.

Upon receiving the network configuration details, the SRU (407) in the electronic device S2 (1204) acquires the network configuration details and client configuration details sent by the STU (406) in the sender electronic device S1 (1201). The SRU (407) in the electronic device S2 (1204) may also provide a notification (1207) indicating acquiring of the network configuration details on the electronic device S2 (1204). Upon acquiring the network configuration details, the SRU (407) hosts the same one or more networks as hosted by the sender electronic device S1 (1201) and allocates same network parameters to the plurality of client electronic devices.

Upon sending the network configuration details, the sender electronic device S1 (1201) disconnects from the second hotspot network with communication link L2 (represented by arrow 4). The electronic device S2 (1204) becomes new hotspot access point hosting the first hotspot network with communication link L2. Accordingly, the client electronic devices C3 (1202-3) and C4 (1202-4) disconnect from the sender electronic device S1 (1201) and connect with the electronic device S2 (1204) automatically (represented by arrow 5), as described in reference to FIG. 5A above.

Further, the electronic device S2 (1204) includes a user-interface (1208) corresponding to hotspot settings. The user-interface (1208) may include text portion indicating current hotspot session details, network details, and client status details. Thus, the user-interface (1208) indicates client electronic devices C3 (1202-3) and C4 (1202-4) are connected with the electronic device S2 (1204) via link L2. On the other hand, the user-interface (1203) corresponding to hotspot settings of sender electronic device S1 (1201) indicates the client electronic devices C1 (1202-1) and C1 (1202-2) are connected with the first hotspot network via link L1 and client electronic devices C3 (1202-3) and C4 (1202-4) are disconnected from the sender electronic device S1 (1201).

Figure 13:
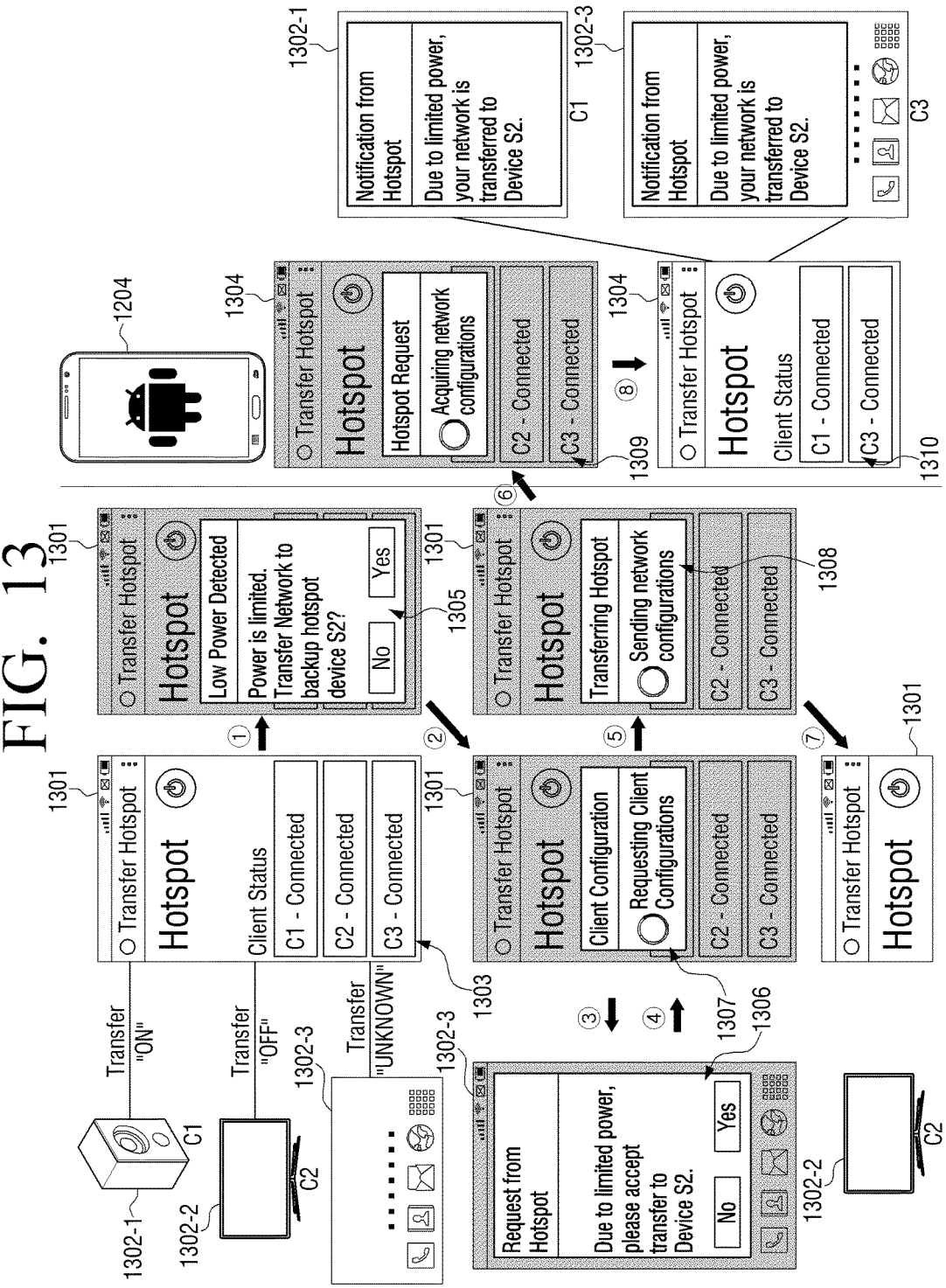
FIG. 13 illustrates an eighth example manifestation of transferring hotspot session, in accordance with an embodiment of the disclosure.

FIG. 13 illustrates an eighth example manifestation of transferring hotspot session, in accordance with an embodiment of the present disclosure. In the example, the hotspot session is transferred to an electronic device and details of connected client electronic devices are transferred to the electronic device based on preconfigured transfer permission data. Accordingly, FIG. 13 illustrates a sender electronic device S1 acting as a host access point and hosting one or more hotspot networks. Plurality of client electronic devices (1302-1, 1302-2, 1302-3) can be communicatively coupled to the sender electronic device S1 (1301) via one or more communication links. For the sake of brevity and ease of understanding, only three client electronic devices C1 (1302-1), C2 (1302-2), and C3 (1302-3) have been illustrated.

Further, sender electronic device S1 (1301) has been preconfigured with the transfer permission data for the client electronic devices C1 (1302-1), C2 (1302-2), and C3 (1302-3). The transfer permission data can be received from each of the client electronic devices (1302-1, 1302-2, 1302-3) during initial connection with the sender electronic device S1 (1301) and saved in a memory of the sender electronic device S1 (1301). The preconfigured transfer permission data indicates if client details can be transferred to any other electronic device capable of providing a hotspot device. In addition, the preconfigured transfer permission data indicates a list of one or more electronic device to which the client details can be transferred. In addition, during initial connection, the sender electronic device S1 (1301) transmits parameters to each of the client electronic devices (1302-1, 1302-2, 1302-3). The parameters enable the client electronic devices (1302-1, 1302-2, 1302-3) to identify the sender electronic device S1 (1301) and include information such as MAC address of the sender electronic device S1 (1301). The client electronic devices (1302-1, 1302-2, 1302-3) store the parameters in a memory. The stored parameters are used to identify electronic device capable of providing hotspot network during re-connection, as described in later paragraphs.

In the example, the sender electronic device S1 (1301) has been configured with transfer permission data as 'ON' for the client electronic device C1 (1302-1). This indicates that client details can be transferred to any other electronic device. Similarly, the sender electronic device S1 (1301) has been configured with transfer permission data as 'OFF' for the client electronic device C2 (1302-2). This indicates that client details cannot be transferred to any other electronic device. Likewise, the sender electronic device S1 (1301) has been configured with transfer permission data as 'Unknown' for the client electronic device C3 (1302-3). This indicates that no permission data was preconfigured for the client electronic device C3 (1302-3).

Further, the sender electronic device S1 (1301) includes a user-interface (1303) corresponding to hotspot settings. The user-interface (1303) may include text portion indicating current hotspot session details, network details, and client status details indicating connected or not.

In accordance with the present disclosure, the STRDU (404) in the sender electronic device S1 (1301) detects an event or requirement for transferring hotspot session, as described in reference to FIG. 5A above. The event can be low power in the sender electronic device S1 (1301).

Upon detecting the event corresponding to the transfer of hotspot session, the TDDU (405) in the sender electronic device S1 (1301) detects an electronic device S2 (1304) for transferring the hotspot session. In one implementation, the electronic device S2 (1304) can be a preconfigured backup access point as described in reference to FIG. 12 above. In another implementation, the electronic device S2 (1304) can be an electronic outside the one or more networks hosted by the sender electronic device S1 (1301) as described in reference to FIGS. 7, 8, 9, 10, and 11 above.

Accordingly, the TDDU (405) provides a notification (1305) on the sender electronic device S1 (1301) (represented by arrow 1). The notification (1305) may include text portion indicating the event and availability of the electronic device S2 (1304). The notification (1305) may also include user-selectable item to transfer the hotspot session. Upon accessing the user-selectable item, the TDDU (405) selects the electronic device S2 (1304) as the target access point for creating the hotspot network, as described in reference to FIG. 5A above.

Upon selecting the electronic device S2 (1304), the TDDU (405) in the sender electronic device S1 (1301) fetches the preconfigured transmission permission data for each of the client electronic devices (1302) from the memory. The sender electronic device S1 (1301) determines 'transmission permission data' is configured as 'Unknown' for the client electronic devices (1302-3) from the fetched data. Upon determining, the TDDU (405) requests for transfer permission from the client electronic device (1302-3) (represented by arrows 2 and 3).

Accordingly, upon receiving the permission request, the SRU (407) in the client electronic device (1302-3) provides a notification (1306) on the client electronic device (1302-3) (represented by arrow 3). The notification (1306) may include text portion indicating the event and availability of the electronic device S2 (1304). The notification (1306) may also include user-selectable item to accept transfer of the hotspot session. Upon accessing the user-selectable item, the SRU (407) in the client electronic device (1302-3) transmits an acknowledgment to the TDDU (405) in the sender electronic device S1 (1301) (represented by arrow 4). Upon receiving the acknowledgement, the TDDU (405) the sender electronic device S1 (1301) obtains client configuration details of the client electronic device (1302-3). The TDDU (405) the sender electronic device S1 (1301) may also provide a notification (1307) indicating requesting or acquiring of the client configuration details on the sender electronic device S1 (1301).

Upon selecting the electronic device S2 (1304) and upon obtaining the client configuration details, the STU (406) in the sender electronic device S1 (1301) transmits the request for hotspot session transfer including network configuration details and client configuration details to the electronic device S2 (1304) (represented by arrows 5 & 6), as described in reference to FIG. 5A above. It would be understood that if the client electronic device (1302-3) does not grant the permission request, the STU (406) will not transmit the client configuration details of the client electronic device C3 (1302-3). Similarly, the STU (406) will not transmit the client configuration details of the client electronic device (1302-2) since the transmission permission data for the client electronic device (1302-2) is configured as 'OFF'. However, the STU (406) transmits the client configuration details of the client electronic device (1302-1) since the transmission permission data for the client electronic device (1302-2) is configured as 'ON'.

Further, the STU (406) may also provide a notification (1308) indicating transferring of the network configuration details on the sender electronic device S1 (1301). In addition, the STU (406) in the sender electronic device S1 (1301) transmits client configuration details, as described in reference to FIG. 5A above, if the electronic device S2 (1304) can be outside the hotspot network.

Upon receiving the network configuration details, the SRU (407) in the electronic device S2 (1304) acquires the network configuration details and client configuration details sent by the STU (406) in the sender electronic device S1 (1301). The SRU (407) may also provide a notification (1309) indicating acquiring of the network configuration details on the electronic device S2 (1304). Upon acquiring the network configuration details, the SRU (407) hosts the same one or more networks as hosted by the sender electronic device S1 (1301) and allocates same network parameters to the plurality of client electronic devices (1302-1, 1302-2, 1302-3).

Upon sending the network configuration details, the sender electronic device S1 (1301) disconnects from the one or more hotspot networks (represented by arrow 7). The electronic device S2 (1304) becomes new hotspot access point hosting the one or more hotspot networks. Accordingly, the client electronic devices C1 (1302-1), C2 (1302-2), and C3 (1302-3) disconnect from the sender electronic device S1 (1301). The client electronic devices C1 (1302-1) and C3 (1302-3) connect with the electronic device S2 (1304) automatically (represented by arrow 8), as described in reference to FIG. 5A above.

On the contrary, upon disconnecting from the hotspot network, the client electronic device C2 (1302-2) identifies the electronic device S2 (1304) as new hotspot access point with same network parameters. During initial connection, the electronic device S2 (1304) transmits parameters to the client electronic device C2 (1302-2). The parameters enable the client electronic device (1302-2) to identify the electronic device S2 (1304) and include information such as MAC address of the electronic device S2 (1304). Upon receiving the parameters, the client electronic device C2 (1302-2) fetches the stored parameters of the sender electronic device S1 (1301) from the memory and compares the received parameters from electronic device S2 (1304) with the stored parameters. As the received parameters and the stored parameters are different, the client electronic device C2 (1302-2) stops the connection with the electronic device S2 (1304). In addition, a notification is provided on the client electronic device C2 (1302-2) indicating non-connection. Additionally, the notification can include user-selectable item requesting connection with the electronic device S2 (1304). Upon accessing the user-selectable item, the connection is established with the electronic device S2 (1304) and enable access the hotspot network.

Further, the electronic device S2 (1304) includes a user-interface (1310) corresponding to hotspot settings. The user-interface (1310) may include text portion indicating current hotspot session details, network details, and client status details. Thus, the user-interface (1310) indicates client electronic devices C1 (1302-1) and C3 (1302-3) are connected with the electronic device S2 (1304). On the other hand, the user-interface (1303) corresponding to hotspot settings of sender electronic device S1 (1301) indicates the client electronic devices C1 (1302-1), C2 (1302-2), and C3 (1302-3) are disconnected from the sender electronic device S1 (1301).

Exemplary Hardware

Figure 14:
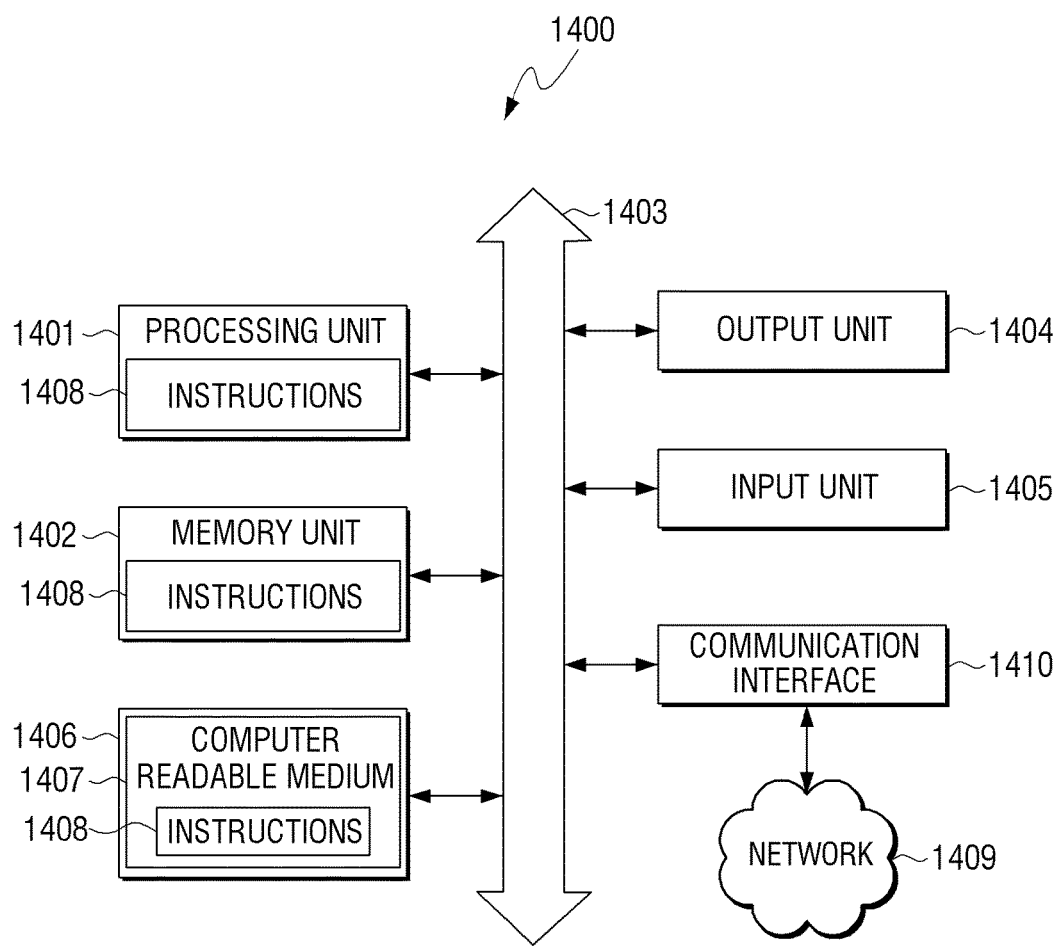
FIG. 14 illustrates a hardware configuration of an electronic device, which is representative of a hardware environment for practicing the present disclosure.

FIG. 14 illustrates a hardware configuration of an electronic device, wherein various embodiments of disclosure can be implemented. The electronic device (1400) can be any of the electronic devices described as above. The electronic device (1400) can include a set of instructions that can be executed to cause the electronic device (1400) to perform any one or more of the methods, in accordance with the disclosure. The electronic device (1400) may operate as a standalone device or may be connected, for example, using a network to other computing systems or peripheral devices.

In a networked deployment, the electronic device (1400) may operate in the capacity of a server or as a client user computer in a server-client user network environment, or as a peer computing system in a peer-to-peer (or distributed) network environment. The electronic device (1400) can also be implemented as or incorporated into a variety of devices, which are capable of executing a set of instructions (sequential or otherwise) that specify actions to be taken by that device. Furthermore, while a single electronic device (1400) is illustrated in the figure, the term "system" shall also be taken to include any collection of systems or sub-systems that individually or jointly execute a set, or multiple sets, of instructions to perform one or more computer functions.

The electronic device (1400) may include a processing unit ("a processor") (1401) e.g., a central processing unit (CPU), a graphics processing unit (GPU), or both. The processing unit (1401) may be a component in a variety of systems. For example, the processing unit (1401) may be part of a standard personal computer or a workstation. The processing unit (1401) may be one or more general processors, digital signal processors, application specific integrated circuits, field programmable gate arrays, servers, networks, digital circuits, analog circuits, combinations thereof, or other now known or later developed devices for analyzing and processing data. The processing unit (1401) may implement a software program, such as code generated manually (i.e., programmed).

The electronic device (1400) may include a memory unit ("memory") (1402), such as a memory unit (1402) that can communicate via a bus (1403). The memory unit (1402) may be a main memory, a static memory, or a dynamic memory. The memory unit (1402) may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory unit (1402) includes a cache or random access memory for the processing unit (1401). In alternative examples, the memory unit (1402) is separate from the processing unit (1401), such as a cache memory of a processor, the system memory, or other memory. The memory unit (1402) may be an external storage device or database for storing data. Examples include a hard drive, compact disc ("CD"), digital video disc ("DVD"), memory card, memory stick, floppy disc, universal serial bus ("USB") memory device, or any other device operative to store data. The memory unit (1402) is operable to store instructions executable by the processing unit (1401). The functions, acts or tasks illustrated in the figures or described may be performed by the programmed processing unit (1401) executing the instructions stored in the memory unit (1402). The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the electronic device (1400) may or may not further include an output unit ("outputter") (1404), such as an audio unit and/or a display unit. The examples of the display unit include, but are not limited to a liquid crystal display (LCD), an organic light emitting diode (OLED), a flat panel display, a solid state display, a cathode ray tube (CRT), a projector, a printer or other now known or later developed display device for outputting determined information. The output unit (1404) may act as an interface for the user to listen/see the functioning of the processing unit (1401), or specifically as an interface with the software stored in the memory unit (1402) or in a removable storage device. Additionally, the electronic device (1400) may include an input unit ("Inputter") (1405) configured to allow a user to interact with any of the components of system (300). The input unit (1405) may be a number pad, a keyboard, or a cursor control device, such as a mouse, or a joystick, remote control or any other device operative to interact with the electronic device (1400). Sometimes, a single IO unit, such a touch screen display, can serve the function of the output unit (1404) as well as the input unit (1405).

The electronic device (1400) may also include a disk or optical drive unit (1406). The disk drive unit (1406) may include a computer-readable medium (1407) in which one or more sets of instructions (1408), e.g. software, can be embedded. Further, the instructions (1408) may embody one or more of the methods or logic as described. In a particular example, the instructions (1408) may reside completely, or at least partially, within the memory unit (1402) or within the processing unit (1401) during execution by the electronic device (1400). The memory unit (1402) and the processing unit (1401) also may include computer-readable media as discussed above.

The present disclosure contemplates a computer-readable medium that includes instructions (1408) or receives and executes instructions (1408) responsive to a propagated signal so that a device connected to a network (1409) can communicate voice, video, audio, images or any other data over the network (1409). Further, the instructions (1408) may be transmitted or received over the network (1409) via a communication port or interface ("communicator") (1410) or using the bus (1403). The communication port or interface (1410) may be a part of the processing unit (1401) or may be a separate component. The communication port or interface (1410) may be created in software or may be a physical connection in hardware. The communication port or interface (1410) may be configured to connect with the network (1409), external media, the output unit (1404), or any other components in the electronic device (1400) or combinations thereof. The connection with the network (1409) may be a physical connection, such as a wired Ethernet connection or may be established wirelessly as discussed later. Likewise, the additional connections with other components of the electronic device (1400) may be physical connections or may be established wirelessly. The network (1409) may alternatively be directly connected to the bus (1403).

The network (1409) may include wired networks, wireless networks, Ethernet Audio Video Bridging (AVB) networks, or combinations thereof. The wireless network may be a cellular telephone network, an 802.11, 802.16, 802.20, 802.1Q or Worldwide Interoperability for Microwave Access (WiMax) network. Further, the network (1409) may be a public network, such as the Internet, a private network, such as an intranet, or combinations thereof, and may utilize a variety of networking protocols now available or later developed including, but not limited to Transmission Control Protocol/Internet Protocol (TCP/IP) based networking protocols.

In an alternative example, dedicated hardware implementations, such as application specific integrated circuits, programmable logic arrays and other hardware devices, can be constructed to implement various parts of the electronic device (1400).

The present disclosure can be implemented on a variety of electronic and computing systems. For instance, one or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

Any one or more of the methods or logic as described may be implemented in part by software programs executable by a computing system. Further, in a non-limited example, implementations can include distributed processing, component/object distributed processing, and parallel processing. Alternatively, virtual computing system processing can be constructed to implement various parts of the electronic device (1400).

The electronic device (1400) is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

The foregoing example embodiments and advantages are merely examples and are not intended to be limiting. The present disclosure can be readily applied to other types of apparatuses. Also, the description of the example embodiments of the present disclosure is intended to be illustrative, and not to limit the scope of the claims.

What is claimed is:

1. A method for communicating of a host device in a network comprising the host device and a plurality of client devices of the host device, which communicate through the host device to access the network, the method comprising:

detecting, by the host device, an event to transfer a hot spot session of the host device, which is a host access point in the network, to a new host device;

based on detecting the event, determining a client device from among the plurality of client devices as the new host device; and sending a request for hotspot session transfer and client configuration details corresponding to the plurality of client devices to the new host device, wherein the request for the hotspot session transfer is a signal for operating the new host device as a new host access point in the network.

2. The method as claimed in claim 1, wherein detecting the event comprises:

monitoring a powering state, a shutdown state, a memory availability state, and a network availability state of the host device, and a state of client devices coupled with the host device; and based on a state being at least one of a powered-off state of power within the host device, memory space within the host device being within a preset memory space, a shutdown state of the host device, and an unavailable state of the network, determining the host device to be in an unavailable state as the host access point in the network.

3. The method as claimed in claim 1, wherein determining the client device as the new host device comprises:

transferring a request for the hotspot session to the plurality of client devices; and selecting a client device transmitting an acknowledge message from among the plurality of client devices as the new host device.

4. The method as claimed in claim 3, wherein the acknowledge message comprises device parameters and supported protocol lists which are features of a device respectively corresponding to each of the plurality of client devices.

5. The method as claimed in claim 4, wherein determining the client device as the new host device comprises determining the new host device including at least one communication link available in the new host device from among the device parameters and the supported protocol lists of the plurality of client devices.

6. The method as claimed in claim 5, wherein the device parameters and the supported protocol lists comprise at least one communication link which is supported by the plurality of client devices and is available by the new host device.

7. The method as claimed in claim 1, wherein sending the request for the hotspot session transfer comprises:

transferring a hotspot session transferring configuration request to the new host device, and wherein, based on receiving the hotspot session transferring configuration request by the new host device, the plurality of client devices are disconnected from the host device and automatically connected with the new host device.

8. The method as claimed in claim 7, wherein the hotspot session transferring configuration request comprises network configuration data including a network name, a service set identifier (SSID), an operational frequency, a network protocol, a password, a channel of operation, and an encryption type of the host device, and wherein network configuration data corresponding to each of the plurality of client devices includes session information including at least one of an internet protocol (IP) address, a device name, a communication link, a channel of operation, a data limit, a location, and a memory cache of each of the plurality of client devices and state information.

9. The method as claimed in claim 1, wherein the plurality of client devices are at least one that the plurality of client devices have a same network configuration as the host device, the plurality of client devices are coupled with the host device for communication in at least one network hosted by the host device, and the plurality of client devices have proximity to the host device outside at least one network hosted by the host device.

10. The method as claimed in claim 7, wherein the hotspot session transferring configuration request comprises network configuration data corresponding to at least one communication link which is transferred using a message frame, is in an active state on the host device, and is supported by the plurality of client devices.

11. A host device for performing network communication in a network comprising the host device and a plurality of client devices of the host device, which communicate through the host device to access the network, the host device comprising:
   a communication interface; and
   a processor configured to:
      detect an event to transfer a hot spot session of the host device, which is a host access point in the network, to a new host device,
      based on detecting the event, identify a client device from among the plurality of client devices as the new host device, and
      send a request for hotspot session transfer and client configuration details corresponding to the plurality of client devices to the new host device,
   wherein the request for the hotspot session transfer is a signal for operating the new host device as a new host access point in the network.

12. The device as claimed in claim 11, wherein the processor is further configured to:
   monitor a powering state, a shutdown state, a memory availability state, and a network availability state of the host device, and a state of client devices coupled with the host device, and
   based on a state being at least one of a powered-off state of power within the host device, memory space within the host device being within a preset memory space, a shutdown state of the host device, and an unavailable state of the network, identify the host device to be in an unavailable state as the host access point in the network.

13. The device as claimed in claim 11, wherein the processor is further configured to:
   transfer a request for the hotspot session to the plurality of client devices, and
   select a client device transmitting an acknowledge message from among the plurality of client devices as the new host device.

14. The device as claimed in claim 13, wherein the acknowledge message comprises device parameters and supported protocol lists which are features of a device respectively corresponding to each of the plurality of client devices.

15. The device as claimed in claim 14, wherein the processor is further configured to identify the new host device including at least one communication link available in the new host device from among the device parameters and the supported protocol lists of the plurality of client devices.

16. The device as claimed in claim 15, wherein the device parameters and the supported protocol lists comprise at least one communication link which is supported by the plurality of client devices and is available by the new host device.

17. The device as claimed in claim 11, wherein the processor is further configured to transfer a hotspot session transferring configuration request to the new host device, and
   wherein, based on receiving the hotspot session transferring configuration request by the new host device, the plurality of client devices are disconnected from the host device and automatically connected with the new host device.

18. The device as claimed in claim 17, wherein the hotspot session transferring configuration request comprises network configuration data including a network name, a service set identifier (SSID), an operational frequency, a network protocol, a password, a channel of operation, and an encryption type of the host device, and
   wherein network configuration data corresponding to each of the plurality of client devices includes session information including at least one of an internet protocol (IP) address, a device name, a communication link, a channel of operation, a data limit, a location, and a memory cache of each of the plurality of client devices and state information.

19. The device as claimed in claim 11, wherein at least one of the plurality of client devices has a same network configuration as the host device, is coupled with the host device for communication in at least one network hosted by the host device, and has proximity to the host device outside at least one network hosted by the host device.

20. The device as claimed in claim 17, wherein the hotspot session transferring configuration request comprises network configuration data corresponding to at least one communication link which is transferred using a message frame, is in an active state on the host device, and is supported by the plurality of client devices.

* * * * *